Nov. 22, 1966   G. C. GILBERT ET AL   3,286,563
METHOD AND APPARATUS FOR MACHINING BELTS
Original Filed April 13, 1962   14 Sheets-Sheet 1
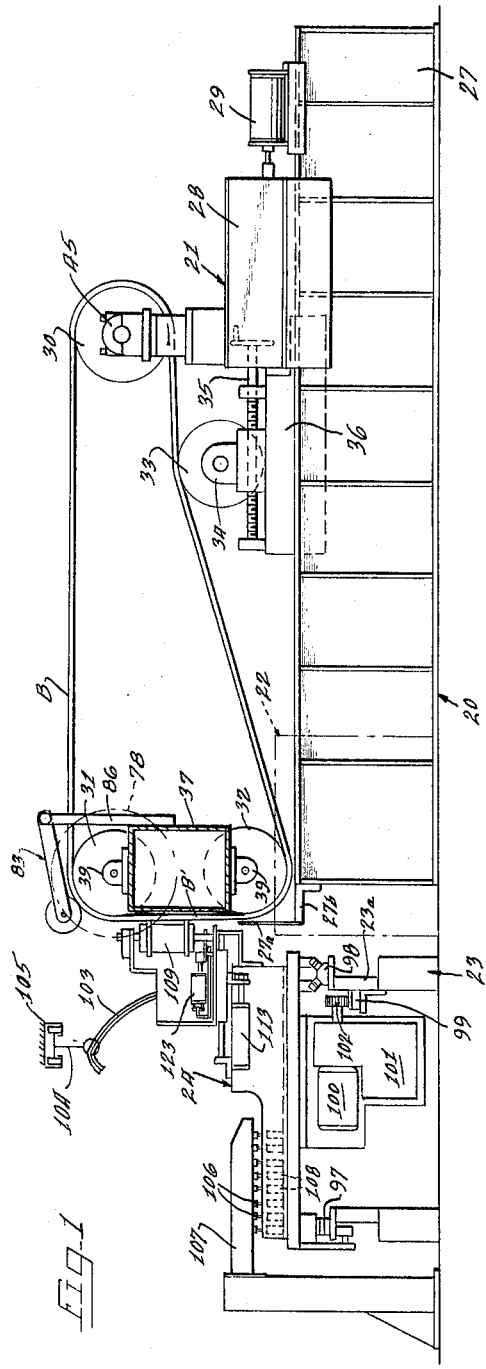
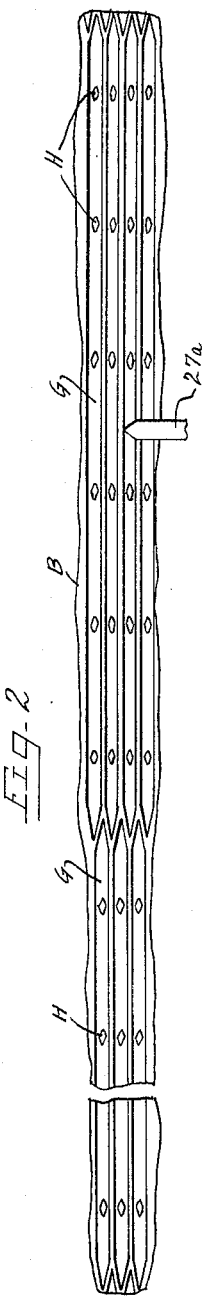
INVENTORS
Gilbert C. Gilbert
BY Jack A. Willcox
Hill, Sherman, Meroni, Gross & Simpson
ATTORNEYS Nov. 22, 1966  G. C. GILBERT ET AL  3,286,563
METHOD AND APPARATUS FOR MACHINING BELTS
Original Filed April 13, 1962  14 Sheets-Sheet 2

INVENTORS
Gilbert C. Gilbert
BY Jack A. Willcox
Hill, Sherman, Meroni, Gross & Simpson
ATTORNEYS

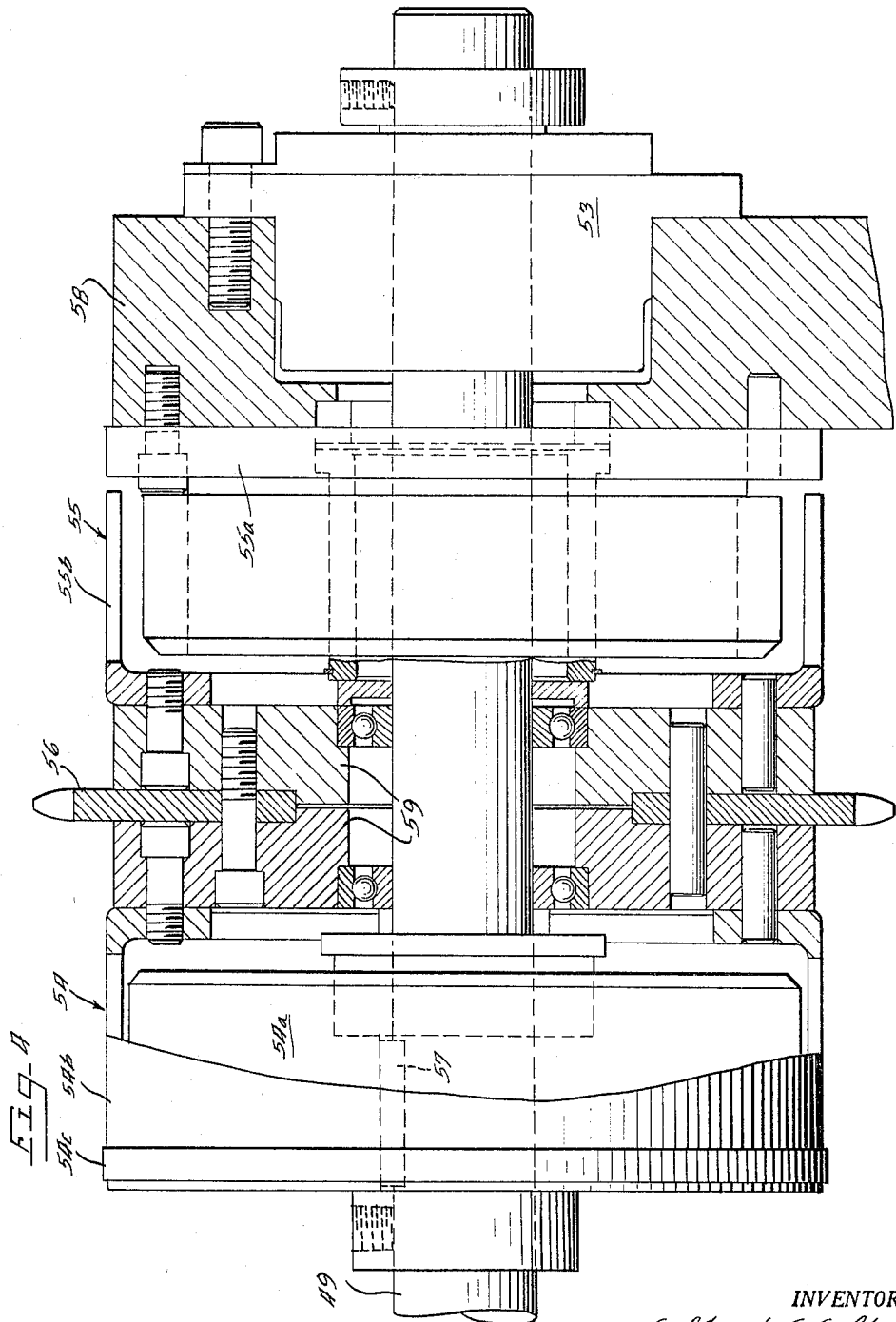

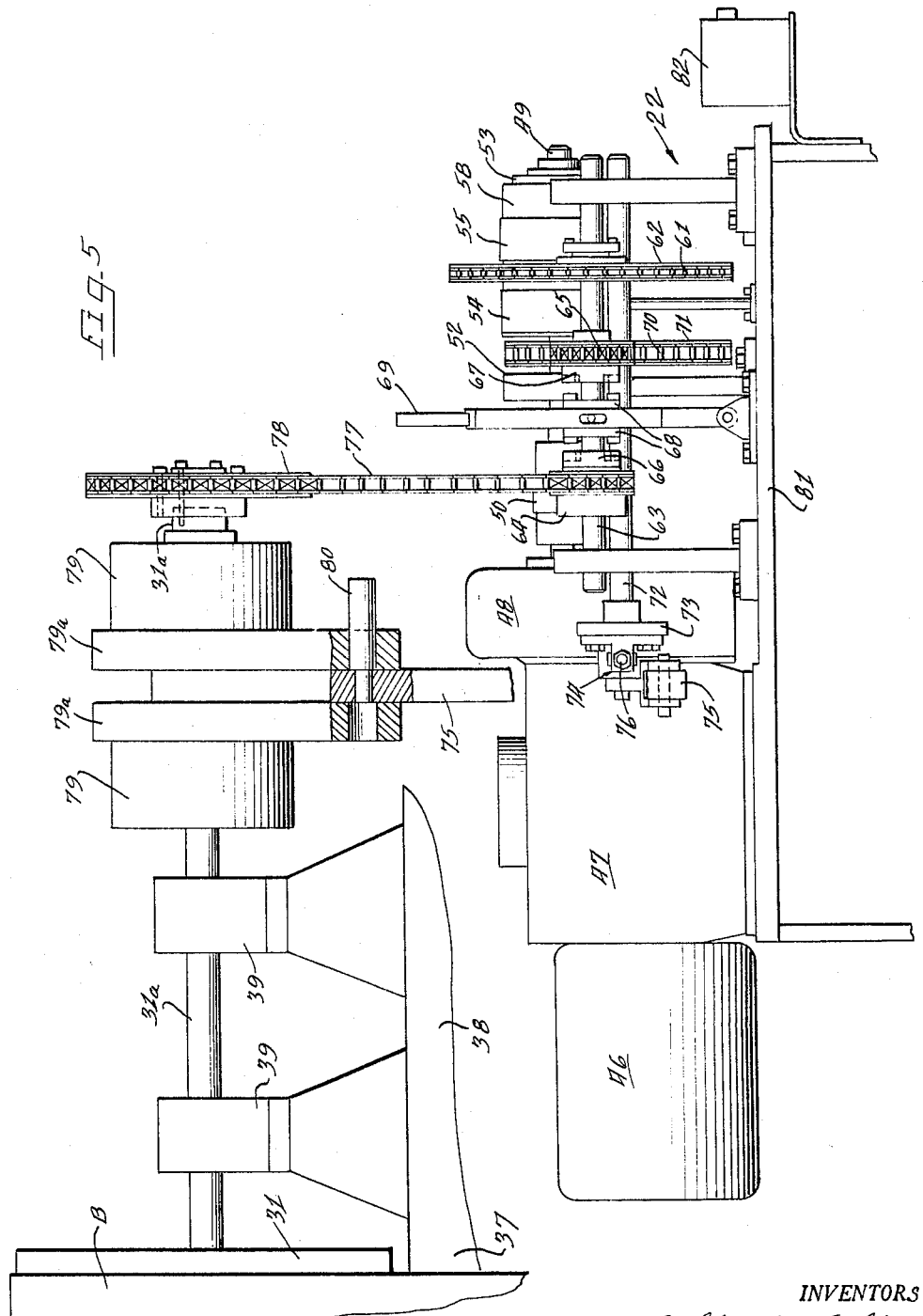

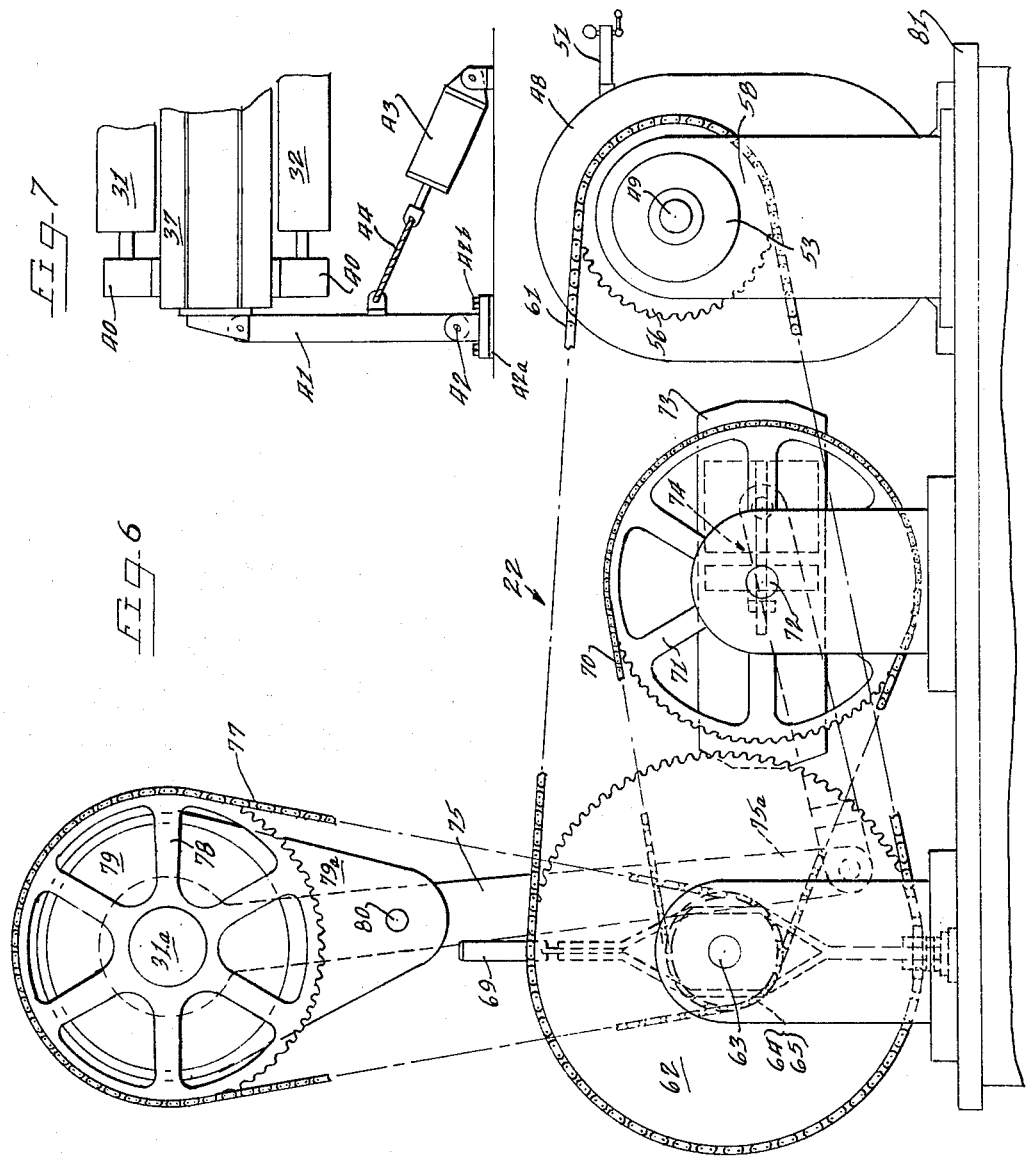

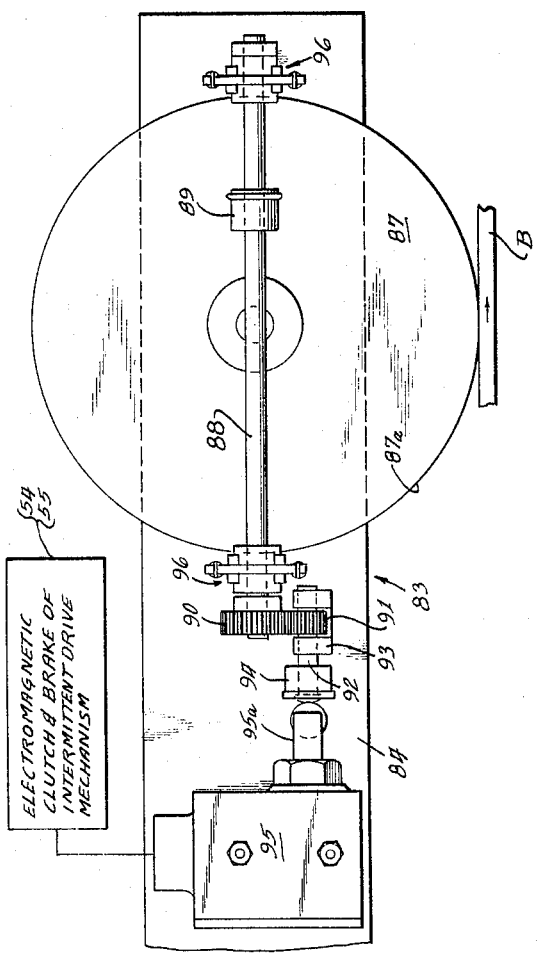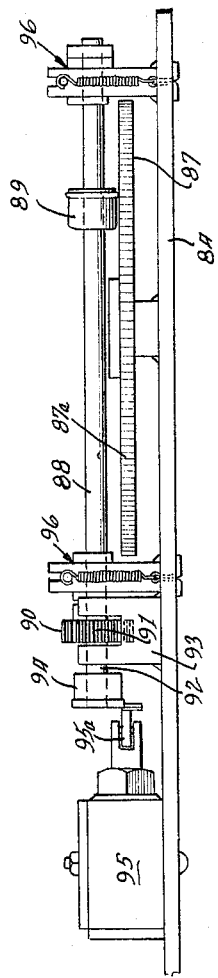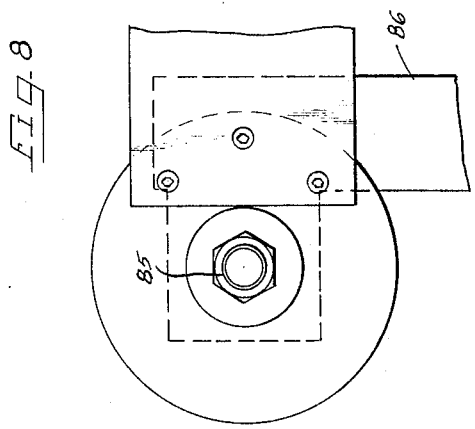

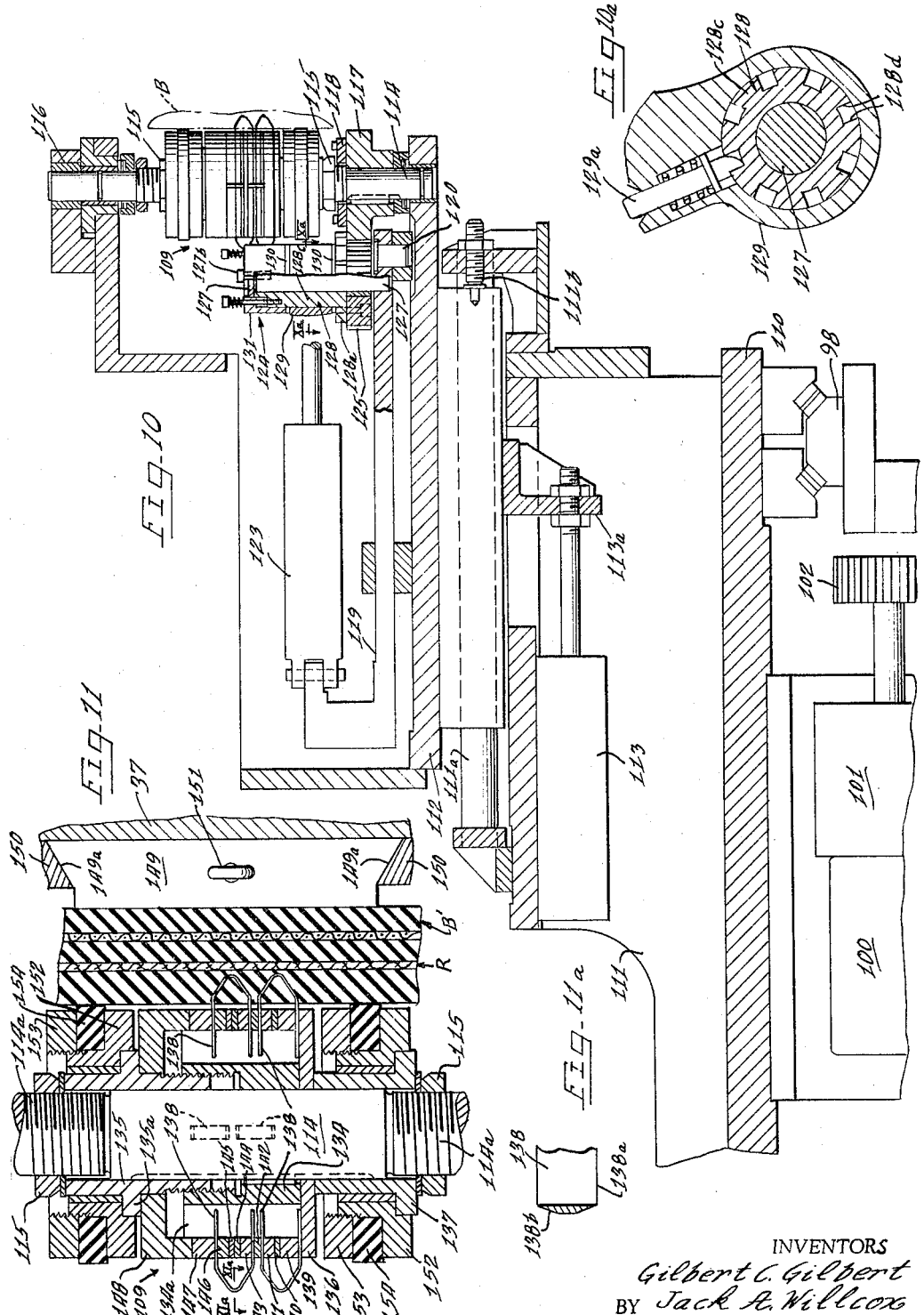

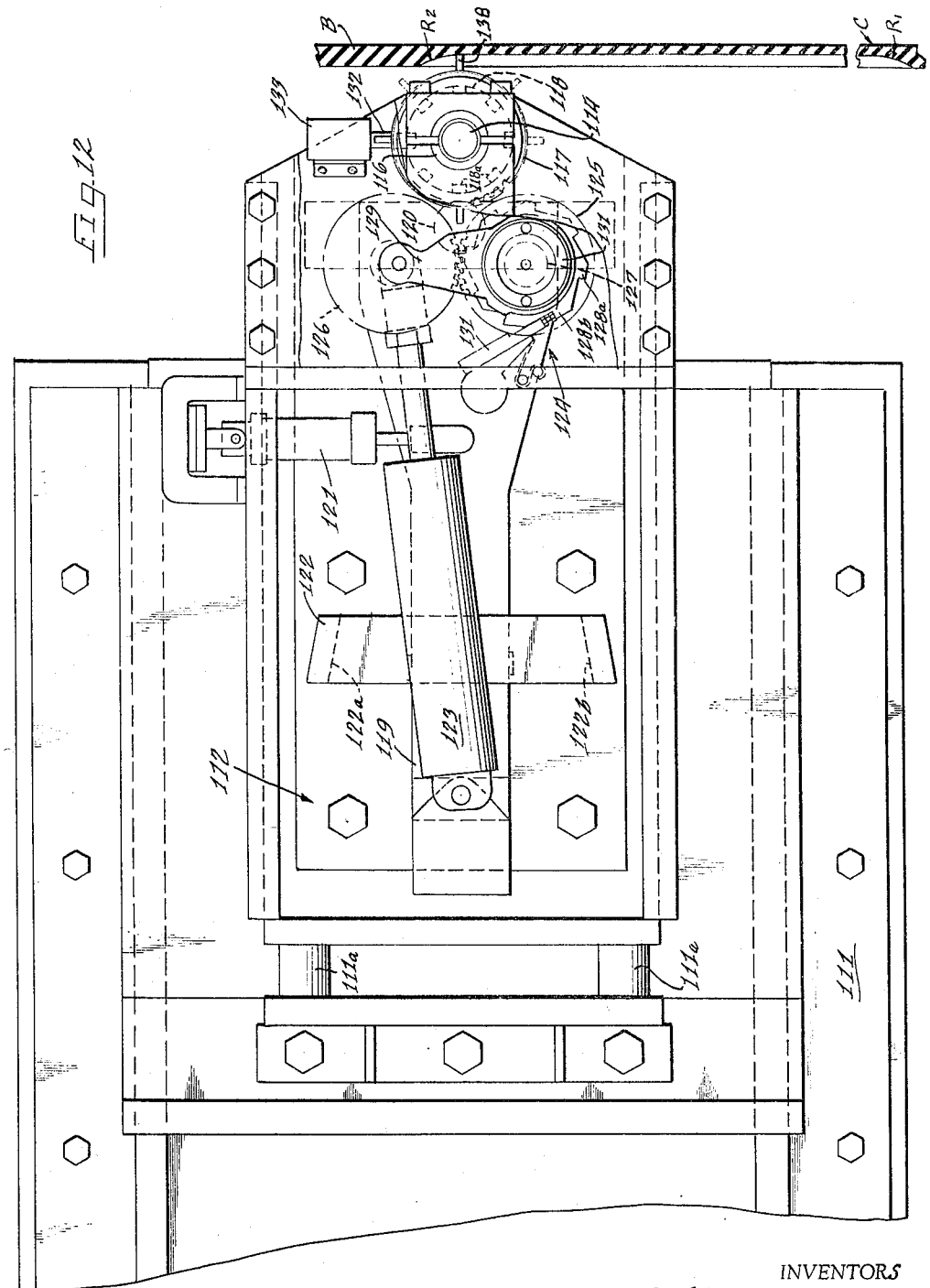

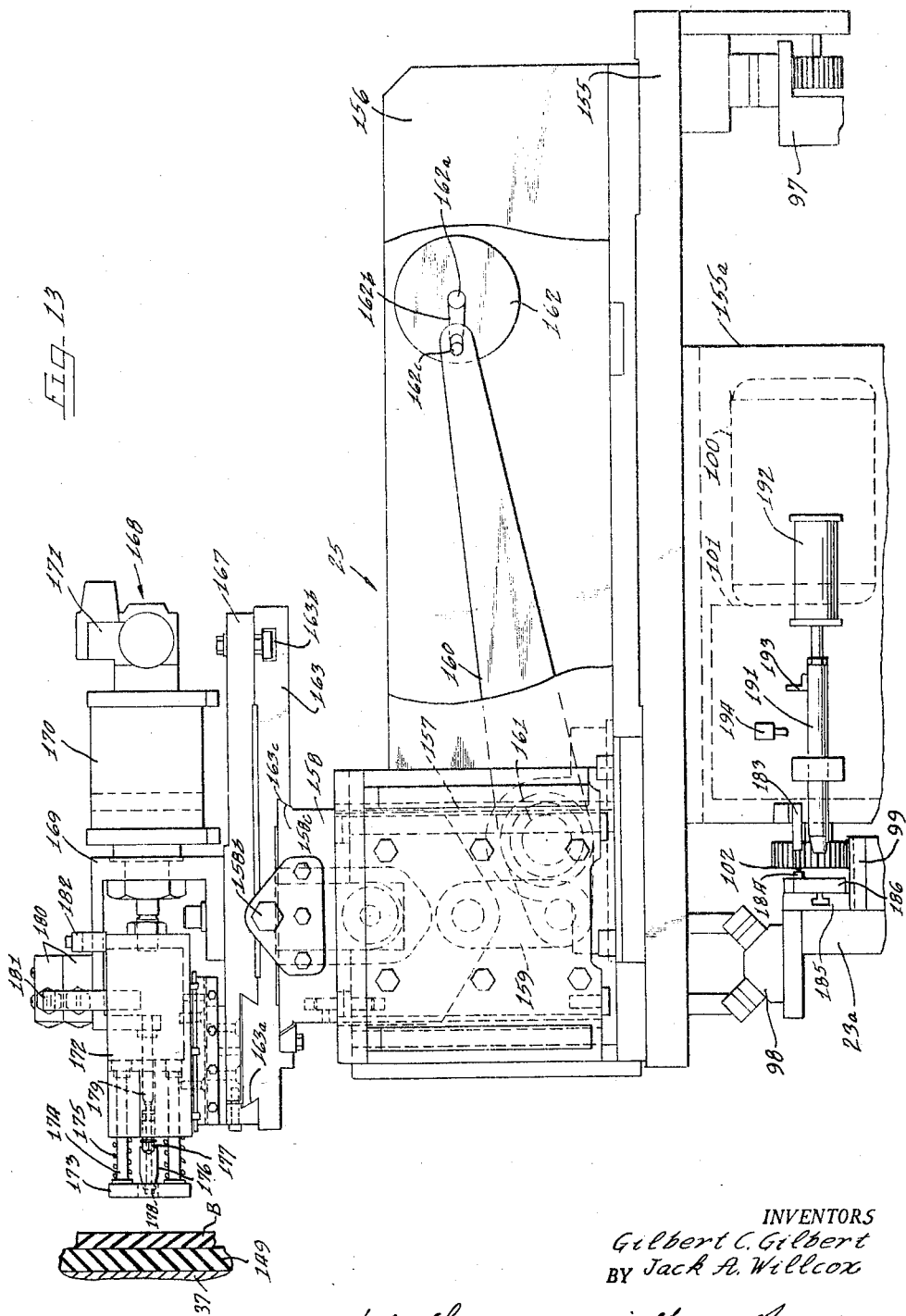

Nov. 22, 1966   G. C. GILBERT ET AL   3,286,563
METHOD AND APPARATUS FOR MACHINING BELTS
Original Filed April 13, 1962   14 Sheets-Sheet 10
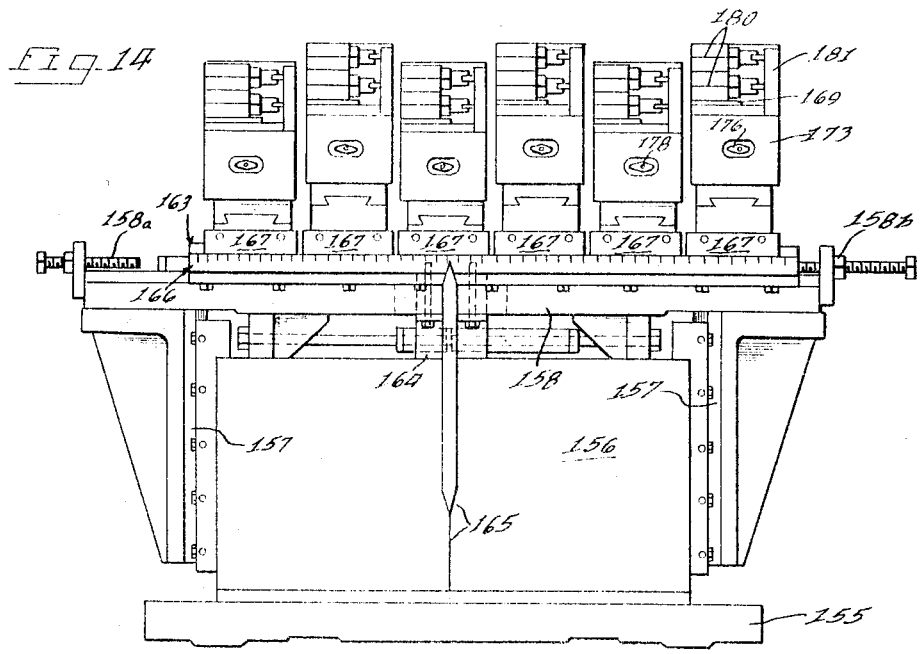
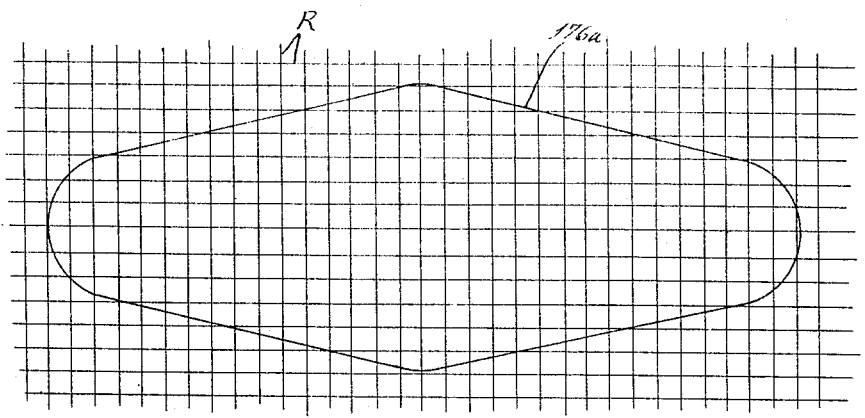
INVENTORS
Gilbert C. Gilbert
BY Jack A. Willcox
Hill, Sherman, Meroni, Gross & Simpson
ATTORNEYS

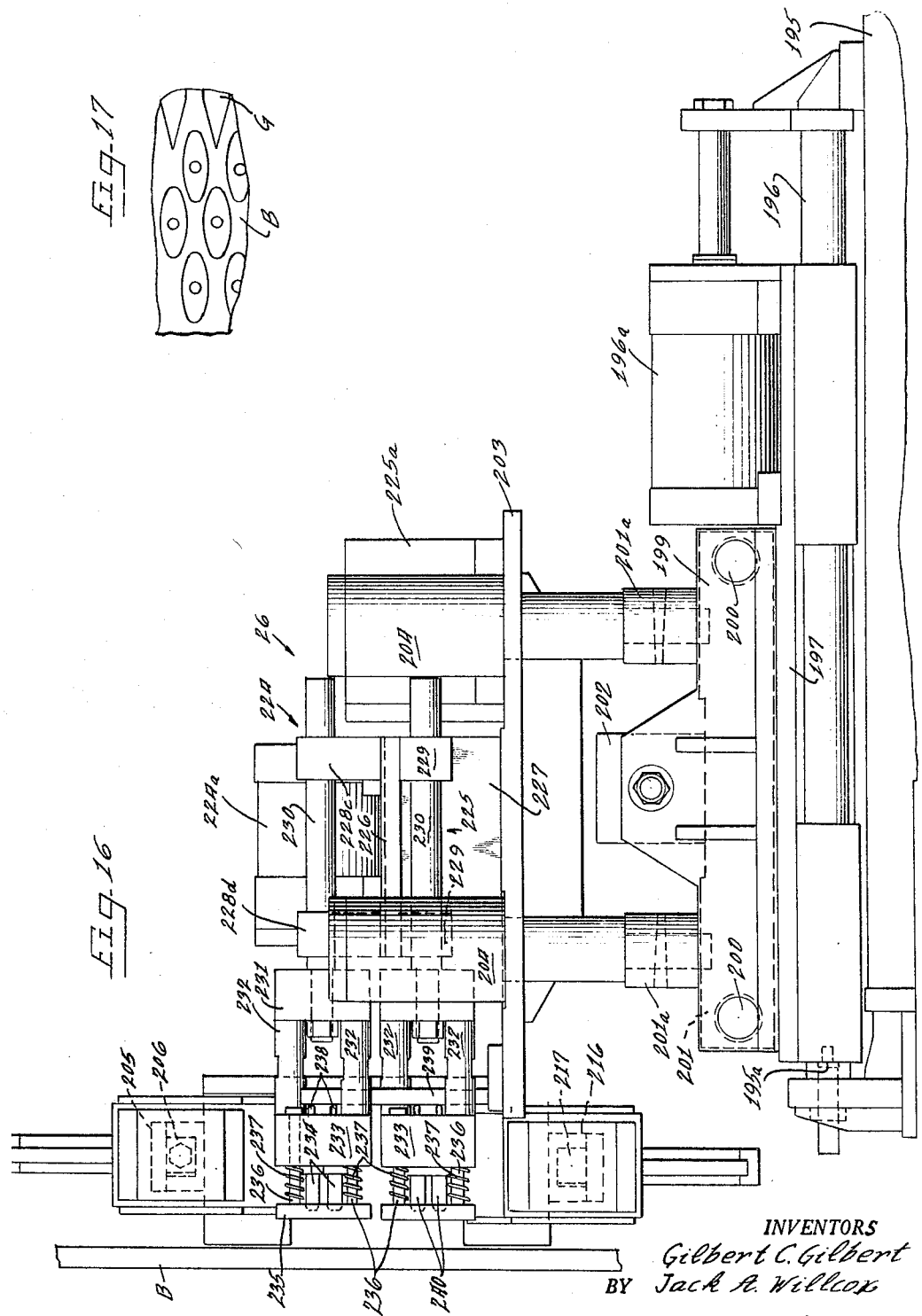

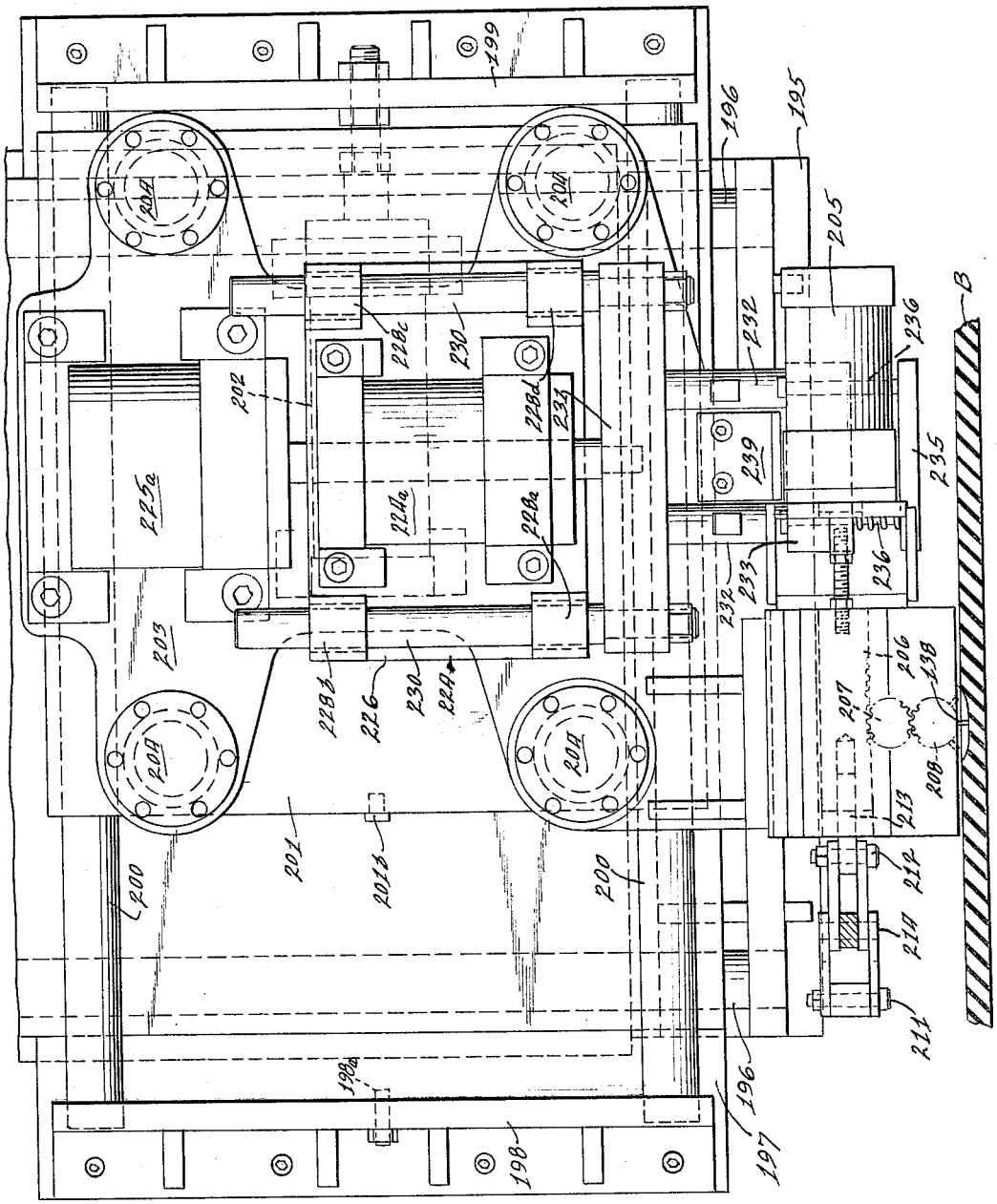

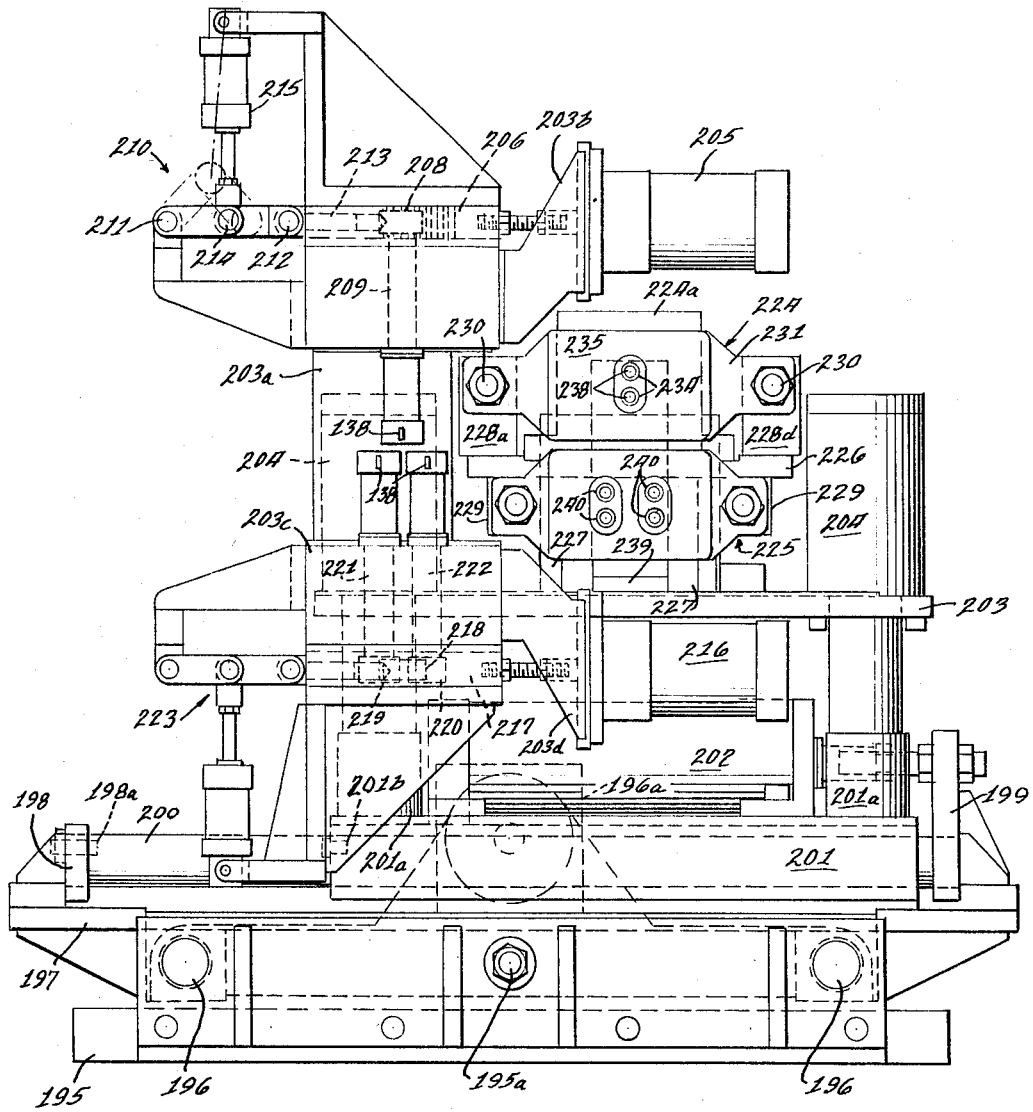

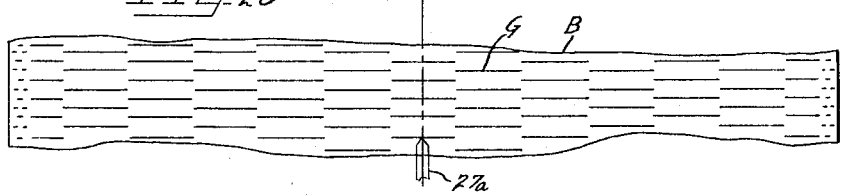
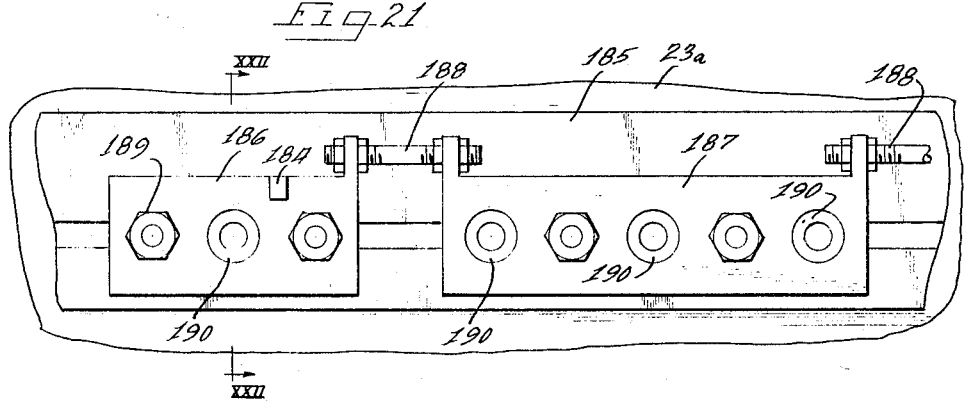
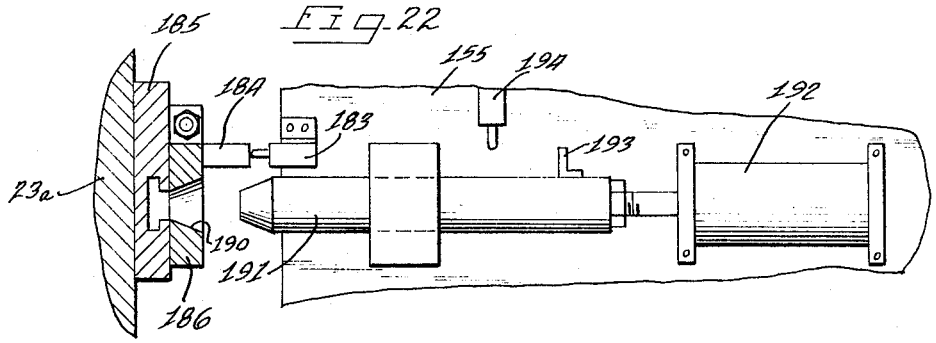

United States Patent Office 3,286,563
Patented Nov. 22, 1966

3,286,563
METHOD AND APPARATUS FOR MACHINING BELTS
Gilbert C. Gilbert, Beloit, Wis., and Jack A. Willcox, Rockford, Ill., assignors to Beloit Corporation, Beloit, Wis., a corporation of Wisconsin
Original application Apr. 13, 1962, Ser. No. 187,376, now Patent No. 3,240,091, dated Mar. 15, 1966. Divided and this application June 28, 1965, Ser. No. 478,005
33 Claims. (Cl. 83—5)

This application is a division of our copending application, U.S. Serial No. 187,376, filed April 13, 1962, now Patent No. 3,240,091.

This invention relates generally to a method and means for machining a belt, and more specifically to an improved apparatus and method for grooving and punching a massive rubber belt.

Although the principles of the present invention may be included in various devices and methods, a particularly useful application is made in connection with the machining of massive rubber belts. In particular, suction boxes of paper making machinery employ such a belt, and by way of illustration, such a belt may have a width of twenty-five feet, a length of thirty-five feet, and a mass so great that the same can be handled best by a crane during installation, removal, and handling thereof. A belt of this type is typically employed between the Fourdrinier wire and the suction box of a paper making machine, and to that end is provided with perforations therethrough which terminate in elongated grooves directed toward the Fourdrinier wire. To adapt such a massive rubber belt to such a usage, it therefore is necessary to provide such grooves and perforations. In a belt of this size, many thousands of grooves and perforations are required.

An unmachined belt of this type, even though it may be internally reinforced, has a certain amount of internal tension which is released or which yields in response to a large amount of machining such as that contemplated. Therefore, the actual belt size and the relative spacing between grooves and perforations have tended to change during the course of machining of the belt. Since a relatively high degree of precision is required in the placement of the grooves and perforations so as to register properly with the suction box structure, it has been considered heretofore impractical to machine such belt other than by hand. It is evident that such a hand-finished belt becomes extremely costly.

Accordingly, it is an object of this invention to provide an apparatus for machining a massive belt.

A further object of the present invention is to provide a method and apparatus for machining a belt, the size of which belt is susceptible to growth during the progress of the machining.

A still further object of the present invention is to provide a method and means for stabilizing internal belt tensions so that subsequent belt growth during subsequent machining may be reasonably accurately predicted or compensated for.

Yet another object of the present invention is to minimize or eliminate hand operations for grooving and/or perforating a belt by adequately compensating for dimensional changes encountered.

A still further object of the instant invention is to provide a method and apparatus for providing a precision uniform predetermined pattern in a suction belt which will produce a uniform and rapid drainage of water into and through the belt.

Attempts have previously been made to machine rubber belts by employing milling or grinding techniques. However, such techniques produce rubber dust, thereby creating fire and explosion hazards which have necessitated performance of the machining under water.

Accordingly, a further object of the present invention is to provide a method and apparatus for machining a massive rubber belt without use of milling or grinding of rubber, and without performing any machining under water, and yet avoiding fire and explosion hazards.

A further object of this invention is to machine large non-rigid belts at relatively high speed, the machining being of a precision nature, and the belt being one which grows as the result of machining.

A further object of this invention is to provide a cutting method and means which continually compensate for belt growth.

Belts of the type described typically employ a wire reinforcement embedded therein. Heretofore, the provision of numerous holes therethrough has tended to expose short lengths of reinforcing material such as wire which hangs loosely in the adjacent hole.

Accordingly, a further object of this invention is to provide a punch shape which will neither crimp nor expose lengths of reinforcing wire.

Experience has also taught that simultaneous grooving and punching is disadvantageous from a quality standpoint. However, the separation of these operations has been previously accomplished only at a great sacrifice of time and cost.

Accordingly, it is a further object of this invention to minimize such time and cost.

It has also been learned that belt life may be lengthened when the holes in the belt are arranged in a staggered fashion.

Accordingly, yet another object of the instant invention is to provide apparatus which will produce belt perforations or holes arranged in a staggered fashion, the pattern of staggering being relatively unrestricted or flexible, and each hole being accurately located.

With an extensive amount of machining to be accomplished on each belt, a problem also arises in connection with removal of the belt material which has been freed by machining. A further problem arises in that the progress of machining should be so disposed as to be readily available for visual inspection even though the belt is of a massive size. Further, adequate support must be provided so that neither the support nor the belt sags during machining, because distortion due to sagging would destroy the precision nature of the machining required.

Accordingly, it is an object of the present invention to dispose the portion of the belt being machined in a vertical plane to facilitate waste removal, visual inspection, and antisag stiffening.

Yet another object of the present invention is to provide a grooving machine for a rubber belt which is capable of producing grooves which are slightly overlapped at their ends, either near the edges of the belt, or anywhere in the central portion of the belt.

A still further object of the present invention is to provide a machine of the type described capable of handling massive workpieces, which machine is simple and which entails a minimum of original and operating cost.

A still further object of the present invention is to provide a machine of the type described embodying an indexing mechanism which compensates for belt stretching and growth and for any sagging which may occur in a vertical span of the belt so as to minimize spacing error in grooving the same.

Yet another object of the present invention is to provide a method and means for grooving and/or perforating a massive rubber belt wherein the accuracy of groove and perforation location is precisely established by the machine.

Yet another object of the present invention is to compensate for any clutch slippage or slippage between the belt and a roll by directly sensing actual belt movement, and by using an indication thereof to regulate the magnitude of belt indexing or movement.

Yet another object of the present invention is to provide a method and means for driving and retracting a cold grooving cutter so as to effect a smooth cut in a rubber belt.

A still further object of the present invention is the provision of means whereby a relatively delicate grooving knife may be rapidly handled without the same being susceptible to breakage.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIG. 1 is a side elevational view of a belt machining apparatus provided in accordance with the principles of the present invention, certain parts being omitted or broken away to clarify the illustation;

FIG. 2 is a fragmentary elevational view of a belt illustrating a portion of a typical grooving and punching pattern provided in the belt;

FIG. 4 is an enlarged cross-sectional view of a clutch and brake assembly illustrated in FIG. 3;

FIG. 5 is a front view of the drive mechanism of FIG. 3 showing its driving connections with the belt-supporting means of FIG. 1;

FIG. 6 is a side view of the drive mechanism shown in FIG. 3;

FIG. 7 is a fragmentary front elevation of the machine shown in FIG. 1;

FIG. 8 is an enlarged detailed view of a belt movement sensing mechanism illustrated in FIG. 1;

FIG. 9 is a bottom view of a portion of FIG. 8;

FIG. 10 is an enlarged side elevational view of a grooving head assembly illustrated in FIG. 1;

FIG. 10a is an enlarged fragmentary cross-sectional view taken along line Xa—Xa;

FIG. 11 is a further enlarged and sectioned view of a portion of the cutter head assembly and belt illustrated in FIG. 10;

FIG. 11a is a fragmentary enlarged view taken along line XIa—XIa of FIG. 11;

FIG. 12 is an enlarged top view of the grooving head assembly illustrated in FIG. 10, the same being partially broken away for clarity of illustration;

FIG. 13 is a side elevational view, taken from the opposite side, of a further machining head employed for perforating the belt by punching;

FIG. 14 is an elevational view of the punching head assembly of FIG. 13 as viewed from the belt;

FIG. 15 is an enlarged diagram illustrating the configuration of the rubber to be removed from the belt during punching;

FIG. 16 is a side elevational view of a still further machining head employed to punch and to groove the edges of the belt;

FIG. 17 is a fragmentary view of the belt illustrating the grooving and punching pattern near the edge of the belt, as produced by the machining head of FIG. 16;

FIG. 18 is a plan view of the machining head of FIG. 16;

FIG. 19 is an elevational view of the machining head of FIG. 16 as viewed from the belt;

FIG. 20 is a fragmentary view of a belt, largely diagrammatic in nature, and shown in scale that is reduced from that employed in FIGS. 2 and 17;

FIG. 21 is a fragmentary elevational view of an adjustable locating template; and FIG. 22 is a side elevational view of a head locating mechanism, a portion of the figure being in cross-section and taken along line XXII—XXII of FIG. 21.

As shown on the drawings:

Figure 3:
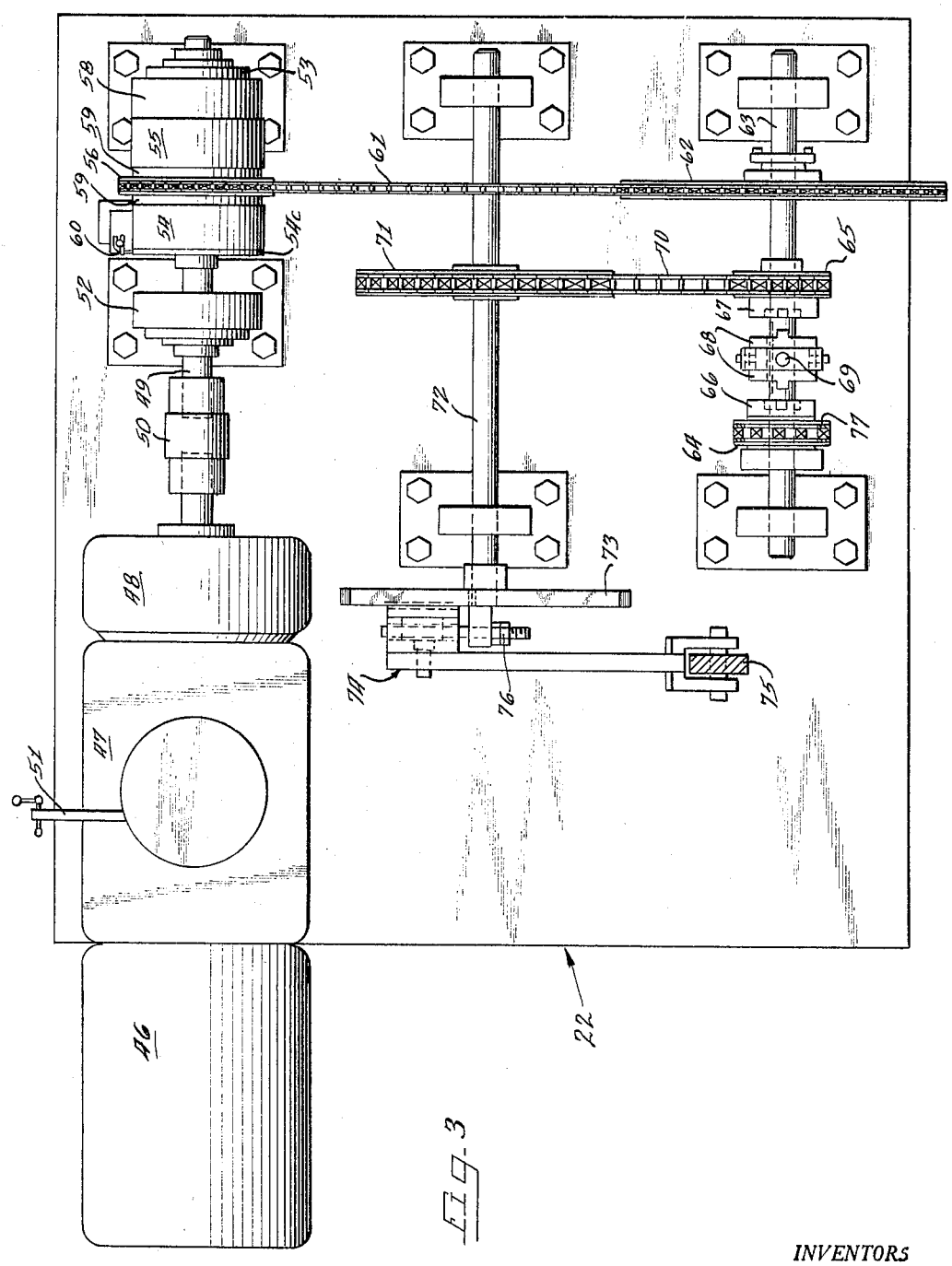
FIG. 3 is a plan view of a drive mechanism for the belt-supporting means illustrated in FIG. 1.

The principles of this invention are particularly useful when embodied in a belt machining device such as illustrated in FIG. 1, generally indicated by the numeral 20. The machining device 20 includes a belt support structure generally indicated at 21, a belt driving and indexing mechanism generally indicated at 22 and shown in FIG. 3, a head support structure generally indicated at 23 which carries a series of machining heads, and of which series of machining heads a grooving head assembly 24 is illustrated in FIG. 1. The machining heads include a punching head assembly 25, and a decal grooving and punching head assembly 26, both omitted from FIG. 1 for clarity, but shown separately in FIGS. 13 and 16 respectively. Although the various components coact on a single belt to produce a unified result, for convenience, the various components of the machine are separately discussed.

Belt support structure 21

The belt support structure 21 includes a plurality of elongated parallel beams 27 which jointly support a slide 28 which extends transversely thereto. The slide 28 is movable in the direction of the beams 27 by means of a number of air cylinders 29 which are adjustably secured to the beam 27 at a selected position. A belt B extends around a group of three inside rolls 30, 31 and 32 and against an outside roll 33. The roll 30 is a stretch roll which is rotatably supported on the slide 28, the roll 30 imparting a constant tension to the belt B by action of the air cylinders 29. The roll 33 is supported by bearing housings 34, each of which is secured to a screw slide 35 carried by a pair of brackets 36 secured to the lower portion of the slide 28. The slide 28, the rolls 30 and 33, the bearing housings 34, the screw spindles 35, and the brackets 36 move as a unit in response to the air cylinders 29 while supported on the beams 27 to impart a constant tension to the belt B. Positioning of the screw spindles 35 relatively repositions the guide roll 33 for guiding the belt B in a cross-machine direction.

The inside rolls 31 and 32 are rotatably supported at their ends by bearings secured to a cantilevered backup beam 37 shown in cross-section, the broken away supporting portion being secured to and supported by the nearer beam 27, such portion being partially illustrated at 38 in FIG. 5. The roll 31 comprises a drive roll, it being driven as is explained later herein. The lower roll 32 is an idler roll which disposes a portion of the belt B' in a vertical plane parallel to the front face of the backup beam 37. It is to be understood that the air cylinders 29 can be selectively relocated on the beams 27 to adapt the machine 20 to different lengths of belt B.

Each of the rolls 31 and 32 has an extended journal directed toward the viewer, each of which is rotatably supported by a pair of pillow blocks 39, seen also in FIG. 5. As best seen in FIG. 7, the opposite ends of the rolls 31 and 32 are each provided with a journal, each of which is rotatably supported by a pillow block 40. The pillow blocks 39 and 40 are secured to the cantilevered backup beam 37. As best seen in FIG. 7, during normal operation, the free end of the cantilevered backup beam 37 is supported by an arm 41 which is pivotally mounted as at 42, the arm 41 normally being held in tight supporting engagement with the backup beam 37 by a cylinder 43 acting through a cable 44. Upon release of cable tension by extension of the cylinder 43, the cable 44 may be loosened so that the arm 41 may pivot to a horizontal position to enable installation and removal of the belt.

Due to inherent resiliency, the free end of the backup beam 37 illustrated in FIG. 7 may be deflected into and out of proper alignment. To insure that the arm 41 steadies the backup beam in a position which is proper, the same is made vertically and horizontally (perpendicularly to the drawing) adjustable. In FIG. 7, vertical adjustability is indicated as being provided by a shim or wedge 42a of suitable thickness, while horizontal adjustability is provided through a number of attachment screws 42b which extend through slots in the pivot base. It will be understood that the vertical and horizontal adjustability of the arm 41 may be effected in numerous manners.

Referring again to FIG. 1, it will be noted that the journals of the roll 30 are pivotally supported by a split member 45. With the split member 45 loosened, an overhead crane can lift the belt B by hoisting the stretch roll 30, then moving the same in a cross-machine direction to slip the belt B off the free ends of the rolls 31 and 32. It is to be understood that a structure such as shown in FIG. 7 could also be provided for the stretch roll 30, it being suitably supported at the opposite end, to thereby enable a fork lift truck to handle the belt B. After the roll 30 and belt B have been carried away by the crane, the roll may be slipped out and associated with the next belt to be machined. The process is then reversed for installing the same on the belt support structure 21.

It is evident that the belt B is thus rotatably supported under constant tension for continual or intermittent movement in either direction. The mechanism for obtaining such movement is discussed beginning at the following paragraph.

*Belt driving and indexing mechanism 22*

The belt driving and indexing mechanism 22 is illustrated in FIGS. 3–6. Referring to FIG. 3, the mechanism 22 includes an electric motor 46 which is drivably connected to a speed reducer 47, the output of which is connected to a gearbox 48 to rotate a shaft 49 by means of a coupling 50. The motor 46, speed reducer 47, and gearbox 48 jointly comprise an electrically driven variable speed drive of known construction, the output of which is a constant speed determined selectively by the position of a speed selector 51. The shaft 49 is rotatably supported by bearings 52, 53. Encircling the shaft 49 is an electromagnetic clutch 54 and an electromagnetic brake 55, between which is a sprocket 56.

Referring to FIG. 4, the electromagnetic clutch 54 has an inner portion 54a which is keyed as at 57 to the shaft 49, and an outer portion 54b. The electromagnetic brake 55 has an inner portion 55a which is secured in fixed position to a bearing support 58, and an outer portion 55b. The sprocket 56 is clamped between a pair of clamping blocks 59, 59 for corotation therewith, the clamping blocks 59, 59 being respectively secured to the outer casing 54b of the clutch 54 and the outer casing 55b of the brake 55. Suitable bearings are provided for the clamping blocks 59 so that the radial load on the sprocket 56 is not carried by the clutch and brake. It is thus evident that the outer casings of the clutch 54 and brake 55 are corotatable with the sprocket 56 as a unit. The clutch 54 includes a slip ring 54c which is energized from an electric brush 60 (FIG. 3). When the clutch 54 is energized, the sprocket 56 is corotatable with the shaft 49. When the brake 55 is energized, the sprocket 56 is locked to the bearing bracket 58 whereby rotation of the sprocket is prevented. The shaft 49 passes through the brake 55 and is free to rotate therein. When neither the brake nor the clutch are energized, the sprocket 56 is neither driven nor locked. When the clutch 54 is energized and the brake 55 deenergized, the sprocket 56 is driven, and when the clutch 54 is deenergized and the brake 55 energized, the sprocket 56 is locked. It is to be understood that the clutch and brake are alternatively energized. The structure for controlling the same is described later herein.

Referring again to FIG. 3, the sprocket 56 through a main drive chain 61 drives a sprocket 62 which is corotatably secured to a rotatable shaft 63. The shaft 63 carries a pair of freewheeling sprockets 64, 65, to each of which sprockets there is secured a portion of a clutch, here illustrated at 66 and 67 as being a portion of a dog clutch or jam coupling. The clutch portions 66 and 67 are corotatable with the associated sprockets and also thus turn freely with respect to the shaft 63. The other portion of the clutches 66, 67 is shown at 68, the same being keyed to the shaft 63 to be corotatable therewith but slidable axially thereon in response to movement of a handle 69. Movement of the handle 69 to the left engages the portion 68 with the portion 66 to drive the sprocket 64 continually for effecting continual belt rotation. The portion 68 is engageable with the clutch portion 67 to drive the sprocket 65 to obtain intermittent or indexed belt movement. To this end, the sprocket 65 drives a chain 70 which in turn drives a sprocket 71 corotatably carried on a shaft 72, to the end of which there is secured a plate 73 on which there is carried an adjustable eccentric generally indicated at 74, movement of which reciprocates an indexing arm 75. The adjustable eccentric 74 includes an adjustment bolt 76, the position of which determines the magnitude of eccentricity and hence the magnitude of reciprocatory movement of the indexing arm 75. The indexing arm 75 and a chain 77 on the sprocket 64 are each connected to drivably rotate the drive roll 31 as best seen in FIGS. 5 and 6.

The chain 77, which is continually drivable by the sprocket 64, is drivably connected to a sprocket 78 which is corotatably secured to the shaft 31a or journal of the roll 31. Thus, when the handle 69 is positioned to engage the clutch 66, 68, the electromagnetic clutch 54 being energized, the drive roll 31, and hence the belt B, is continually driven at a constant speed. If the electromagnetic clutch be deenergized, or if the handle 69 be moved to a central position as illustrated, the belt will coast, but if the brake 55 be energized with the handle 69 left in a clutch-engaging position, the belt movement will be immediately braked.

The indexing arm 75 is reciprocated at its lower end 75a by the eccentric mechanism 74, and at its upper end, the indexing arm 75 is carried by the drive roll shaft 31a in a free manner. As best seen in FIG. 5, the drive roll shaft 31a also supports a pair of ratchet clutches 79, 79, each of these comprising a one-way clutch of known internal construction, and having an adaptor plate 79a, adapted to be alternatively driven by the indexing arm 75. To this end, a dowel pin 80 is provided to form a selectable connection between the indexing arm 75 and one of the adaptor plates 79a. The clutches 79, 79 are each one-way clutches, but each is adapted to drive the journal shaft 31a in an opposite direction. It is therefore evident that each complete cycle of the eccentric mechanism 74 will produce movement of the drive roll 31 in a selected direction, until the movement of the indexing arm 75 is reversed, thereby causing the corresponding or selected ratchet clutch 79 to slip. In a preferred embodiment, the eccentric mechanism 74 is not employed to determine the magnitude of belt movement, but preferably other means described below responsive to actual belt movement are employed to control operation of the clutch 54 and brake 55, whereby the desired increment of belt movement may be greater than or lesser than one full stroke or cycle of the indexing arm 75.

The various fixed components of the mechanism 22 described are secured to a base plate 81 which is rigidly secured by appropriate bracketing to the beam 27 so as to be fixedly carried. There is also provided a power supply 82 of a conventional type for the clutch 54 and brake 55.

It is contemplated that the grooving and punching described below will be carried out with the belt B in a stationary locked position, or succession of stationary locked positions. The purpose therefore of the continual drive mechanism including the clutch 66, 68, the sprocket 64, the chain 77, and the sprocket 78 is therefore here explained. We have found that the internal tensions of a fresh unmachined belt are subject to considerable variations and can be stabilized by an appropriate treatment. Accordingly, after the fresh belt has been installed as shown in FIG. 1, and the guide roll 33 has been properly adjusted, the clutch handle 69 is positioned to drive the belt support rolls through the chain 77, the electric clutch 54 being energized. As previously explained, this produces a continual rotation or running of the belt B about a plurality of axes defined by the various rolls. During this operation, a normal tension is applied to the belt through the air cylinders 29. It has been found that if the belt B is thus rotatably driven for a substantial period of time, the various internal tensions in the belt become stabilized so that the belt can thereafter be machined, namely be provided with grooves and holes at relatively closely dimensioned locations, for example with an error not exceeding approximately plus or minus 1/64 of an inch within a pattern segment, such tolerance being nonaccumulative. The belt B is thus rotated for a period of time sufficient to stabilize the internal tensions.

A simple reliable indication of stabilization of such internal tensions has also been discovered. The fresh belt, with the guide roll 33 and backup beam 37 properly adjusted, will appear to track properly when so rotated. However, continued rotation releases various tensions, and the belt position drifts by an unpredictable amount. However, when the belt has been so rotated for a while, such drifting disappears, and thus we have learned that the cessation of drifting evidences that the internal belt tensions have been stabilized. This relationship has been found to be true in actual practice. A preferred method of sensing such drift is to provide a reference marking on the belt which extends along its length, such as near its center. This mark will be disposed substantially adjacent to a pointer 27a (FIG. 1) carried by a bracket 27b secured to one of the beams 27. The use of a central mark avoids possible confusion between lateral belt drift and lateral belt growth. Thus, when the belt achieves a stable effective length and position as a result of continual rotation in the manner described, the belt is ready for precision machining, namely accurately providing precisely located grooves and apertures. When this is to be done, the clutch handle 69 is moved to its opposite limit of travel to enable transmission of power through the chain 70 and the adjustable eccentric 74, through the indexing arm 75 and the one-way clutch 79 to the drive roll 31.

To control the indexing mechanism 22 so as to drive the belt B by a proper predetermined amount, there is provided a pivotally supported odometer generally indicated at 83 in FIG. 1 pivotally supported by a bracket 86 secured to the cantilevered backup beam 37. The odometer 83 is biased against the belt B and is responsive to the actual movement thereof. The odometer 83 is operative to electrically regulate the electromagnetic clutch 54 and the brake 55 in response to a predetermined actual movement of the belt B. It will be appreciated that various structures of odometer 83 will achieve this result, a representative structure being shown in FIGS. 8 and 9. The odometer 83 includes an arm 84 pivotally supported at 85 on the bracket 86 which is secured to a stationary part of the machine such as the backup beam 37. There is provided a disk or wheel 87 which is rotatably mounted on the arm 84 and which has a periphery 87a which is adapted to frictionally engage the belt B. For this purpose, the surface 87a has been illustrated in FIG. 9 as being a straight spline. Adjacent to the wheel 87, there is disposed a shaft 88 on which is carried a friction wheel 89 which is selectably positionable in fixed positions along the shaft 88 to obtain the proper ratio or measured movement. The shaft 88 drives a gear 90 which meshes with a gear 91 carried on a shaft 92 rotatably supported in a bracket 93 secured to the arm 84. The shaft 92 carries a cam 94 which, once per cycle, effects a reciprocatory cycle of a switch follower 95a of an electric switch 95, which is connected through an appropriate circuit to the clutch 54 and the brake 55 to deenergize the clutch and to simultaneously energize the brake in response to a predetermined magnitude of movement of the belt B. Near the ends of the shaft 88, there are provided spring loaded journal supports 96 which maintain the friction wheel 89 in contact with the surface of the disk 87. It is evident that one revolution of the cam 94 represents a certain predetermined belt movement, the magnitude of which is dependent upon the axial position of the adjustable friction wheel 89. In a specific example given later herein, the friction wheel 89 is so set as to produce one revolution of the cam 94 in response to one and one-half inches of belt movement. Such would be the movement if two grooves were made at a time, the centers of the grooves being spaced three-fourths inch apart. In a preferred embodiment, the electromagnetic clutch and brake 54, 55 are also provided with manual controls which may be momentarily operated to inch the mechanism 22 along, for example, to place the belt at a predetermined starting position from which increments of movement are measured. The pivotal support 85 of the odometer 83 thus enables raising of the same to preclude unwanted interaction, and to preclude unwanted operation of the electric clutch and brake during continual rotation of the belt. It is also evident that the odometer may be left engaged with the belt as drawn in FIG. 1 during any such inching along of the belt, in which case the odometer would "remember" the predetermined position or reference point.

Before grooving or punching is done, after the belt has been run-in, the intermittent drive mechanism 22 for the belt is operated through one cycle of the belt, the adjustable friction wheel 89 being axially repositioned as may be required to produce the desired number of arrested movements in one belt cycle. It has been stated earlier that machining of the belt causes a further change in the belt length. Although such growth is minimized by the run-in described, it is sometimes convenient to reset the adjustable friction wheel 89 by a small compensating amount when a small amount of the belt remains to be machined, namely five or ten percent, so as to equally distribute the remaining machining operations in the remaining unmachined portion of the belt. It is evident that under certain circumstances this may also be done by the inching method referred to above.

For the smoothest operation of the machine as a whole, it is recommended that the eccentric mechanism 74 be adjusted to have a stroke substantially equivalent to the position of the adjustable friction wheel 89, even though a wide disparity between these settings does not adversely affect the accuracy of the machine.

It is thus evident that use of an odometer as described compensates entirely for any slippage between the belt and the drive rolls, for linear growth in the belt, and the like.

Where the grooving is carried out prior to the punching, the odometer constitutes an ideal means for accurately controlling the successive positioning of the belt. However, it is to be understood that in certain instances, such as in connection with perforating the belt, a visual monitoring of the amount of indexed movement, the use of a template, or the like, may also be advantageous. In any event, some slight resetting of the adjustable friction wheel 89 prior to perforating a grooved belt may be anticipated.

*Head support structure 23*

Referring again to FIG. 1, the head support structure 23 includes a pair of elongated tracks or rails 97, 98 supported on a track and template support 23a and extending transversely to the machine and parallel to the backup beam 37 and parallel to the axes of the rolls 31, 32. The tracks 97, 98 are stationary and have an elongated configuration which preferably is somewhat greater than the width of the belt B. Thus, for example, if the belt B is twenty-five feet in width, a typical length for the tracks 97 and 98 would be fifty-five feet. A gear rack 99 extends substantially coextensively with the track 98, and is secured in fixed relation to the track 98. Each of the machining heads, such as the grooving head assembly 24 shown in FIG. 1, is provided with suitable means for supporting the head on the tracks 97 and 98 so as to be movable thereon, and, to effect such movement, a suitable mechanism having a driving engagement with the rack 99 is provided. Thus, by way of example, the head assembly 24 includes an electric motor 100 acting through a speed-reducing gear assembly 101 to drive a gear 102 which is in mesh with the gear rack 99.

To provide power to the motor 100, to provide compressed air to the head assembly 24, and to provide other appropriate control thereof, each head, such as the machining head 24, includes a cable 103 which comprises an assembly of all of the different hoses and wiring required. Since the head 24 is movable for a considerable distance on the tracks 97 and 98, the cable 103 of hoses and wiring is of considerable length and is supported at intervals along its length by one or more trolleys 104 supported by a fixed overhead monorail 105. The other ends of the hoses and cables (not shown) are connected to appropriate supplies or controls.

Disposed substantially coextensively along the tracks 97 and 98, there is a group of rods having movable trip dogs thereon, jointly indicated at 106, the rods being supported at intervals along their length by suitable bracket structure 107. The trip dogs coact with a group of limit switches 108 which are arranged to provide appropriate control of various elements in response to a predetermined movement of the machining head 24 on the tracks 97 and 98. It will be appreciated that the control that may be provided by the rod and dog assemblies 106 and the switches 108 may also be manually provided, and the details of such control are therefore not necessary to a full understanding of the instant invention.

As stated above, the device 20 includes a number of different machining heads of which the head 24 is representative. By way of example, one or more grooving heads 24, punching heads 25 (FIGURE 13), and edge punching and grooving heads 26 (FIGURE 16) may be provided. It is to be understood that each of these heads may include features corresponding to those thus described for the head 24 shown in FIGURE 1. Further, if the pattern admits of same, more than one head may act on a different portion of the belt B at the same time. We have found that one simple way of insuring that any head not in use will not inadvertently operate is to provide a suitable switching means to all power leading thereto. A simple example thereof requiring no structure for such purpose is simply a method step, namely the step of disconnecting the cable 103 at either end thereof.

Grooving head assembly 24

The grooving head assembly 24 is generally illustrated in FIGURE 1, but is shown in enlarged detail in FIGURES 10–12. The grooving head assembly 24 includes a cutter support 109 disposed adjacent to the belt B, the cutter support 109 being rotatable incrementally about a vertical axis, its position being further adjustable vertically, and horizontally, both parallel to and perpendicularly to the direction in which the tracks 97, 98 extend.

To achieve proper cutter positioning, the grooving head assembly 24 includes a base plate 110 slidably supported on the tracks 97, 98 as by bearings, and being movable therealong by operation of the motor 100 acting through the gear train 101 to drive the gear 102 as explained before. This structure achieves translation of the cutter support 109 in a direction parallel to the tracks 97, 98. This motion may be utilized to define the full-depth length of any groove made by the grooving head assembly 24.

The base plate 110 supports a lower slide or grooving head portion 111 which includes parallel slide bars 111a which extend in a direction perpendicular to that of the tracks 97, 98. An upper slide or grooving head portion 112 is slidably supported on the slide bars 111a and includes a number of rigidly joined elements which collectively serve as support means for various movable components described below. A double acting air cylinder 113, such as of the dual type, is connected between the lower portion 111 and the upper portion 112 through an adjustable connection 113a. In response to its movement, the cutter support 109 is either retracted from the belt B to facilitate removal and installation of such belt, or is advanced to position the cutters thereof adjacent to the belt B at the proper distance therefrom preparatory to grooving. The actuator 113 thus provides movement of the cutter support 109 toward and away from the belt B, the extent of which movement toward the belt may be limited by the position of an adjustable stop 111b. The stop 111b thus defines the distance that the cutter support 109 can be moved toward the belt B, and thereby further defines the depth of the groove produced in the belt B.

The cutter support 109 includes or is carried on a rotatable shaft 114 which is rotatably supported on the upper slide structure 112 shown in FIGURE 10. As best seen in FIGURE 11, the shaft 114 is threaded at two central portions thereof indicated at 114a, 114a which carry coacting nuts 115, 115 which jointly support the cutter assembly therebetween in a vertically adjustable position. The shaft 114 is rotatably supported at its ends by the upper slide or support means 112 by appropriate bearings (FIGURE 10), there being optionally provided a friction brake 116 at the upper end which continually applies a slight drag to the shaft 114. A spur gear 117 with an optional radially apertured ring 118 secured thereto, is carried on the lower end of the shaft 114 and is corotatable therewith, such as by keying. The shaft 114 is effectively rotated in increments of 45° by rotational forces applied to the cutter gear 117.

The structure for rotating and locking the cutter gear 117 is seen in FIGURE 10 to the left of the shaft 114, and is better seen in FIGURES 10a and 12 and viewed from above. Secured to the upper slide or supporting means 112 is a pivot plate 119 which is pivotal about a pivot-defining means 120 in response to reciprocation of a double-acting air cylinder 121 between limits of engagement defined by a stop plate 122 having stop surfaces 122a and 122b engageable with the sides of the pivot plate 119. These components have been illustrated in FIGURE 12 for clarity in a neutral position, but it will be appreciated that the air cylinder 121 is usually fully extended or retracted, to the extent permitted by the stop surfaces 122a and 122b. The air cylinder 121 is used for reversing the direction in which the cutter assembly is angularly indexed as explained below.

A further double-acting air cylinder 123 is pivotally secured at one end to the pivot plate 119, and at its other end, is secured by an adjustable connection to a ratchet mechanism generally indicated at 124. The ratchet mechanism 124 includes a drive gear 125 which is continually meshed with a reversing gear 126, it being understood that the drive gear 125 or the reversing gear 126 will be in mesh with the cutter gear 117 alternatively in response to the position of the pivot plate 119 as determined by the air cylinder 121. The drive gear 125 has the same number of teeth as the cutter gear 117 so that when the drive gear is driven a predetermined angle about its axis, the cutter gear 117 and hence the shaft 114 will be driven a like angular amount. When the air cylinder 121 is fully extended, only the drive gear 125 will be in mesh with the cutter gear 117, and when the air cylinder 121 is fully retracted, only the reversing gear 126 will be in mesh with the cutter gear 117.

The ratchet mechanism 124 is best understood by a joint reference to FIGURES 10, 10a and 12. The drive mechanism 124 includes a support shaft 127 rigidly secured to the pivot plate 119 as by a press fit, and the drive gear 125 is rotatably carried on the shaft 127. Also rotatably supported by the shaft 127 is a sleeve 128 having a pawl wheel 128a integral therewith and bolted to the drive gear 125 for corotation. The sleeve 128 is retained against axial removal by a washer 127a held axially in place by a screw 127b, which when they are assembled, functionally comprise a rigid upper end of the shaft 127. The sleeve 128 provides rockable support for a lever arm 129 which has a ratchet drive connection with the sleeve 128 shown in FIGURE 10a. A pair of friction washers 130, 130 and a resiliently loaded cap 131 carried by the sleeve 128 act to provide a constant axial frictional loading between the lever arm 129 and the sleeve 128. Remotely from the axis of the shaft 127, the lever arm 129 is pivotally connected to the air cylinder 123.

The ratchet mechanism 124 further includes a pawl 131 which is pivotally supported on the pivot plate 119, and which is of adjustable effective length for engaging successive teeth 128b of the pawl wheel 128a. The effective length of the pawl 131 determines the precise angular locations in which the cutter shaft 114 may be positioned. The ratchet mechanism 124 further includes a ratchet wheel portion 128c on the sleeve 128, the same being defined by a series of recesses which define oppositely directed teeth 128d. To coact therewith, the lever arm 129 includes a resiliently biased pin 129a which has a driving face and a cam face coactive with the teeth 128d to enable relative angular movement between the lever arm 129 and the sleeve 128 in one direction, and to preclude such angular relative movement in the opposite direction.

As viewed in FIGURE 12, when the actuator 123 is movably extended, lever arm 129 is driven in a clockwise direction about the sleeve 128, and by virtue of the abutting relationship between the pawl 131 and the pawl wheel 128a, the sleeve 128 and the drive gear 125 are held against movement. This angular movement continues until the pin 129a of the lever arm 129 is received between the next pair of teeth 128d, as illustrated. Any further extension of the air cylinder 123 merely causes the pin 129a to tend to slip again with respect to the ratchet wheel 128c. Thus, the cutter gear 117 and the cutter support shaft 114 are held against angular movement if either of the gears 125 or 126 is engaged therewith. When the actuator 123 is then retracted, it acts through the lever arm 129 and its pin 129a to rotate the sleeve 128 through the engaged tooth 128d, and thereby also rotate the pawl wheel 128a and drive gear 125 in a counterclockwise direction. When the gear 125 is engaged with the cutter gear 117, it is apparent that such driving movement will also rotate the cutter shaft 114, but in a clockwise direction. Although the pawl teeth 128b are spaced uniformly 45° apart, and although the ratchet teeth 128d are likewise spaced a uniform 45° apart, there is a slight angular offset between these two sets of teeth, such offset being so arranged that when the sleeve is driven through the teeth 128d, the pawl 131 will drop off the adjacent pawl tooth 128b before the cutter movement terminates. Further, the ratchet teeth 128d are so located that when the actuator 123 is moved to the end of its cutter-rotating stroke, the cutter shaft 114 will have been rotated to and through the ultimately desired angular position thereof so that the cutters thereon will have been advanced by a few degrees beyond the point at which the pawl teeth will lock the same. The pawl teeth are so arranged that when the cutter is translated by action of the motor 100, a reactive force from the belt B will act through the cutter to rotate the cutter shaft 114 reversely, and hence also the cutter gear 117 and drive gear 125 to a point where the pawl 131 engages the abutment at the previous pawl tooth 128b.

We have found that this overdriven initial travel provides a lost motion connection or backlash in the system which enables a rapid start-up of translation on the track 97, 98 without breaking the cutter.

When the cutter shaft is to be advanced again, the previous cycle is repeated so as to index the cutter shaft 114 to the next position.

If desired, an interlock may be provided to sense and to indicate that the cutter shaft 114 has been rotated to a proper position. Thus, if desired, and to this end, there may be provided a plunger or rod 132 having a cam-like inner end coactive with the radially apertured ring 118, and operative to close a suitable electric switch 133 forming a part of the control system. It is to be understood that either the plunger 132 or the edges of the radially directed apertures 118a may be provided with the cam-like construction.

The cutter support or assembly 109 includes an annular body 134 slidably disposed on and keyed to the shaft 114. The annular body 134 includes a number of axially directed slots 134a, and a group of internal threads. These threads engage with corresponding threads in a sleeve nut 135, the nut 135 having a flange 135a. At the opposite end of the annular body 134, there is a clamping ring 136 and a sleeve 137. The sleeve nut 135 and the sleeve 137 are disposed between washers and are held on the shaft 114 by the nuts 115, as earlier explained. Between the flange 135a and the clamping ring 136, there is disposed a number of additional clamping rings and spacers which extend about the annular body 134. Tightening of the sleeve nut 135 effects axial clamping of all such additional clamping rings and spacers.

The cutter assembly 109 includes a number of cutters, the illustrated embodiment having eight separate cutters. Each cutter or cutter blade or knife blade in this embodiment is identical to the others, the cutter blade 138 therefore being typical. The cutter blade 138 initially comprises a length of tool steel approximately three-sixteenths to one-fourth inch in width, and approximately .020 inch in initial thickness. The cutter blade material is formed in a U-shape such as shown in FIG. 1. The legs of the U-shape are clamped between suitably spaced clamping rings and also extend radially inwardly into one of the slots 134a in the annular body 134.

FIG. 11a illustrates the preferred mode of sharpening. The cross-section illustrated in FIG. 11a is that which is provided for substantially the entire portion of a U-shape which extends outwardly of the various clamping rings. It will be noted that approximately one-third of the width of the blade 138 is ground away from each edge, the blade thickness being greatly exaggerated in FIG. 11a for clarity of illustration. Further, the material is so removed that opposite edges of the blade 138 comprise knife or cutting edges, such edges being substantially coplanar with the inner surface of the U-shape. Thus, when one edge 138a comprises the leading edge passing through rubber, there is provided a trailing recess 138b on the outside of the cutter. The recess 138b combined with the internally disposed cutting edge 138a comprises a structure which may be utilized at room temperature for cutting rubber at room temperature, the resulting cut being one that is produced without galling and one that is exceptionally smooth to the touch. We have found that a cutter structure 138 is employed of the type described and shown herein, the chip of rubber removed remains intact as a single piece which, as it passes through the cutter 138 as shown in the right-hand portion of FIG. 11, usually stays in the groove, but is readily removed therefrom as by pushing.

In FIG. 2 there is shown a fragmentary portion of a pattern which may be provided in a massive rubber belt B. (The reader is referred to the Beachler et al. U.S. Patent No. 3,025,910 for further information on belts of this type.) It will be noted that the pattern in FIG. 2 includes a series of elongated grooves G which are overlapped at their ends with other similar grooves G. Each of the illustrated grooves typically is about two feet in length, has an internal profile corresponding to the cutter 138, and occurs once every three-fourths inch. Thus, where other grooves G are offset one-half groove, there would be a spacing of about three-eighths inch between adjacent grooves where they overlap. It is evident that where a belt is as large as twenty-five feet in width and thirty-five feet in length, thousands of such grooves would be required, and therefore expeditious production of the same becomes quite urgent. Accordingly, the knives 138 are preferably ground at both edges for grooving in either direction, there being one such pair of knives sunk in the rubber simultaneously. Further, there is a second pair of such knives supported 90 rotational degrees from the first pair, such pairs being axially offset with respect to each other by one-half groove width, such offset amounting to three-eighths inch in the foregoing example. Where eight knives are used as shown, the interval between sharpening times is doubled.

Thus all the legs of all the knives 138 are received in one of the slots 134a of the annular body 134. The lower legs of the lower knives of the lower pairs of knives are received between the clamping ring 136 and a clamping ring 139. The lower legs of the lower knives of the upper pairs of knives are received between the clamping ring 139 and a spacer 140. The upper legs of the lower knives of the lower pairs of knives are received between a pair of clamping rings 141 and 142. The lower legs of the upper knives of the lower pairs of knives are received between the clamping ring 142 and a clamping ring 143. The upper legs of the lower knives of the upper pair of knives are received between the clamping ring 143 and a spacer 144. The lower legs of the upper knives of the upper pair of knives are received between the spacer 144 and a spacer 145. The upper legs of the upper knives of the lower pair of knives are received between a pair of clamping rings 146 and 147. The upper legs of the upper knives of the upper pairs of knives are received between the clamping ring 147 and a clamping ring 148. It is evident that by the omission of selected spacers or clamping rings, the knives 138 will be relocated so as to differently space the grooves and/or to provide them with a different profile.

To produce grooves such as shown in FIG. 2, the cutter shaft 114 is first disposed substantially adjacent to a point C shown in FIG. 12, with the shaft 114 so indexed that no knife engages the rubber. Thereafter, the air cylinder 121 is retracted to engage the reversing gear 126 with the cutter gear 117, and the actuator 123 is reciprocated one cycle which effects substantially one-eighth turn of counterclockwise movement of the drive gear 125, a like amount of clockwise movement of the reversing gear 126, and a like amount of counterclockwise movement of the cutter gear 117 whereby one pair of knives 138 is sunk into the rubber to form the radius $R_1$. Thereafter, the motor 100 drives the assembly so that the knives 138 are advanced to the position shown in solid lines in FIG. 12. Thereafter, the actuator 123 is again cycled once, which operation moves the cutter 138 angularly to form the radius $R_2$ and to dispose the cutters at a 45° position shown in dotted lines. This movement also advances the next cutters to a 45° position wherein they are spaced from the belt B. The head is then translated in the same direction by a small amount and again indexed. This indexing moves the axially offset cutters into the rubber where the foregoing operation is repeated to produce the grooves which are offset half a groove. Preferably, the grooving begins at the center of the pattern adjacent to the pointer 27a and then continues therefrom toward each edge of the belt to the end of that part of the pattern which is to be made by such grooving head. The head is then returned to the center of the pattern and the belt is indexed once by an amount which advances it two groove widths where the foregoing process is repeated.

If desired, the central series of grooves and one adjacent offset series of grooves may be produced first throughout the length of the belt by the disclosed mechanism since both the belt and the cutter head can be indexed at the ends of the four-foot example used to illustrate this operation. It is to be understood that each time that the direction of movement of the head 24 is to be reversed, the actuator 121 is also moved to its opposite extreme.

During the travel of the actuator 121, there is a condition which exists temporarily such as that shown in FIG. 12 wherein neither of the gears 125 or 126 is positively engaged with the cutting gear 117. As the previous gear is being disengaged, there is a possibility that a slight nudge could be exerted on the cutter gear 117. This possibility is provided against by the friction brake 116 which holds the shaft 114 substantially stationary during shifting of gears, thereby insuring proper re-engagement of gears.

As has been stated before, during machining of the belt B by this machine, a portion B' of the belt passes in front of the backup member 37. As best seen in FIG. 11, the inner or rear face of the vertical portion B' is engaged by a rubber platten 149 to support the same. The rubber platten 149 includes integral dovetail portions 149a which are slidably received between dovetail defining means 150 carried on the backup beam 37. The rubber platten 149 preferably is slightly harder than the belt B, and has a portion that projects from the dovetails 149a, 150 to engage the belt B. During usage, wear results, and occasionally damage may occur, such as during punching of the belt B. Since the rubber platten is substantially entirely within the belt B, structure is provided by which appropriate corrective action may be taken without dismounting the belt. To that end, an eyelet 151 is provided on each end of the platten 149 to which a tension may be applied for slightly shifting the platten or completely withdrawing it. Similarly, a new platten may be installed from either end of the machine. A tension applied to one of the eyelets 151 releases the frictional drag present at the dovetails. It is to be understood that the illustration of the platten 149 has not been made to scale.

To insure that the belt B is disposed squarely against the rubber platten 149 and is seated firmly thereagainst, means are provided adjacent to the cutters 138 to insure that the belt is properly seated. To this end, the outer surface of the sleeve nut 135 rotatably supports an annular member 152 which has threaded engagement with an annular clamping member 153, and between which members 152 and 153 there is disposed an extrudable friction ring 154, as of rubber. By suitable positioning of the member 153 with respect to the member 152, the ring 154 is radially extruded by a selected amount so as to engage the outer surface of the belt B when the upper slide 112 is in grooving position. Similar members are also supported by the outer surface of the sleeve 137 at a point below the knives 138.

After the belt has been provided with grooves of the type described and shown in FIG. 2, such grooves being shown in greater number as mere lines in FIG. 20, the belt B is ready to be perforated.

*Punching head assembly 25*

After the grooves G have been provided in the belt B, the grooving head 24 is moved out of the way and the punching head 25, illustrated in FIGS. 13 and 14 is moved into position. The structure shown in FIG. 13 is adapted to provide suction apertures H as shown in FIG. 2. The punching head assembly 25 includes a base plate 155 supported on the tracks 97, 98 and driven therealong by means corresponding to that shown and described for the grooving head of FIG. 10. Thus, a second electric motor 100 drives a second pinion 102 through a second gear box 101, the pinion 102 being again engaged with the rack 99 supported by the track and template support 23a.

On the base plate 155, there is provided a box-like frame 156 having a vertical pair of dovetails 157, 157 which vertically slidably guides a lower slide assembly 158 of a saddlelike configuration. The lower slide assembly 158 is vertically supported by a link 159 pivotally secured thereto and to a lifting lever 160, the lever 160 being pivoted as at 161 to the frame 156. Acting between the opposite end of the lever 160 and the frame 156, there is a pneumatic rotary actuator 162 of a known type. The actuator 162 includes an output shaft 162a acting through an arm 162b and pin 162c, the pin 162c being received within a slot in the lever 160. The rotary actuator 162 is of the type that has a full travel less than half a turn. When the actuator 162 drives in a counter-clockwise direction as illustrated, the link 159 is raised to shift the saddle-like lower slide assembly 158 upwardly with respect to the frame 156 by an amount corresponding to one-half groove, the same amounting to three-eighths inch in the foregoing example.

The lower slide assembly 158 slidably supports an upper slide assembly 163 for movement between adjustable stops 158a and 158b. This movement is effected by a double acting actuator 164 shown in FIG. 14, the cylinder of which is secured by an appropriate bracket to the upper slide assembly 163, and the double ended rod of which is secured to the lower slide assembly 158. To facilitate setting up the head assembly 25 for punching a predetermined pattern, there is provided a pointer and index structure 165 carried by the frame 156, the upper end of the pointer registering with a scale 166 on the upper slide assembly 163. The index and pointer structure 165 represents the center or reference point of a pattern, with respect to which various punching assemblies to be described may be located. While these may be locked in a single position by means of the stops 158a, 158b, it is preferable that the stops 158a and 158b enable movement of the upper slide assembly 163 in response to forces provided by the actuator 164 so that the pattern may be shifted horizontally if desired to produce a horizontally offset pattern, as is explained more fully below.

The upper slide assembly 163 has an upwardly directed dovetail 163a and an upwardly opening T-slot 163b with which corresponding means on the bottom of a punch assembly base 167 may cooperate for attachment purposes. Six such punches have been illustrated in FIG. 14 so as to be able to provide six perforations substantially at the same time in a particular set of grooves as shown in FIG. 2. Where a lesser number of holes is desired, the extra punches may be either physically removed or electrically disabled. By the removal of one of the punch assembly bases 167 and its associated punch, a greater variety in lateral spacing is enabled. Further, as seen in FIG. 14, the punch assembly bases 167 may be provided in various thicknesses, two such thicknesses being illustrated. Thus, there is a plurality of a punch assembly bases of the same thickness. The vertical staggering thus provided and illustrated in FIG. 14 enables the punching of belt perforations H by three of the illustrated punches in one groove, and by the other three in the adjacent groove.

Referring to FIG. 13, each of the punch assembly bases 167 supports a punch assembly or punching unit generally indicated at 168. Each punching unit 168 includes a U-shaped bracket 169 bolted to the base 167 and supporting an air cylinder or actuator 170 which is under the operative control of an electric high speed pneumatic valve 171. The rod of the air cylinder or actuator 170 is connected to a box-shaped slide 172, the lower surface of which comprises a dovetail coacting with dovetail structure on the base 167. In front of the box-shaped slide 172 there is a presser and stripper plate 173 to which a number of bolts 174 are attached. The bolts 174 are slidably received in and guided by the slide 172, their heads serving to limit forward movement thereof. A number of springs 175 act between the presser and stripper plate 173 and the box-shaped slide 172 to bias the presser and stripper plate toward the belt B. A hollow punch 176 is secured to the box-shaped slide 172 by a clamping means indicated at 177. Within the punch 176, there is a plunger 178 which extends completely therethrough and which is retained therein by a shoulder on such plunger, the plunger 178 being engageable with a stop 179 secured fixedly to an extension of the U-shaped bracket 169. The bracket 169 also supports a pair of limit switches 180, the upper one of which is adapted to be tripped by a dog 181 at the rearward end of a stroke, and the lower one of which is adapted to be tripped by a second dog 182 at the forward end of the stroke.

When the valve 171 admits air to the cylinder or actuator 170, the box slide 172 is driven forwardly so that the plate 173 engages the belt B and presses it firmly against the platten 149. Further movement of the slide 172 compresses the springs 175 storing energy therein, and also advances the punch 176 with respect to the plate 173 and into the belt B. Further movement causes the cutting edge of the punch 176 to pass entirely through the belt B, a rubber slug thus being received within the punch 176. Upon reversal of movement of the actuator cylinder 170, the box slide 172 is retracted. The air cylinder 170 is a double-acting type and therefore, a positive force is applied to withdraw the punch 176 from the belt B. During such withdrawal, the springs 175 continue to hold the plate 173 against the belt B to assist in stripping the same from the outer periphery of the punch 176. After the heads of the bolts 175 have re-engaged the slide 172, and the slide 172 has retracted further to create a gap between the plate 173 and the belt B, the inner end of the plunger 178 engages the stop 179, thereby arresting movement of the plunger 178. This also arrests the rearward movement of the rubber slug within the punch 176, and further retraction of the slide 172 and punch 176 strips the punch 176 from the now stationary rubber slug to eject the same. The plunger 178 has a length which enables it to project from the cutting edge of the punch 176 when the punch is retracted, thereby positively insuring complete ejection of the rubber slug.

The punching head may be indexed along the tracks 97 and 98 to various positions therealong, each such position representing a row of grooves G. Stated otherwise, the punching head 25 may be employed at successive adjacent positions across the width of the belt, the rotary actuator 162 being operated to its alternate positions as the head moves from one to the next row of grooves where groove staggering is employed such as shown in FIG. 20. This type of punching preferably is performed beginning at the center row of grooves, then working toward each of the opposite belt edges. As this type of punching continues, any growth of belt length may be readily compensated for as previously explained.

In accordance with a further principle of this invention, it is preferable that the grooving pattern in the belt B be arranged so that there is a central row of grooves flanked by one or more rows of grooves on alternate sides thereof and symmetrical about the center line. Where the size of belt and size of groove enables the provision of an odd number of grooves, the provision of a central groove is inherent. Where the sizes are such that an even number of grooves would appear to be required, it is preferable to make the number odd artificially by dividing one of the grooves into two lengths of half a length each, respectively disposed near the edges of the belt B as illustrated in FIG. 20. Thus, in this example, theoretically 12 rows of grooves were needed. One such row is disposed in the center, five rows are placed on either side thereof, and the 12th row is split, half of it appearing near the left edge and half near the right edge. Such a pattern arrangement is of primary importance and benefit in connection with punching a belt. Once such a pattern has been obtained, it is possible and is recommended to punch the central row around the entire length of the belt first, then to punch the immediately adjacent row on one side of the center row, then to punch the other immediately adjacent row on the other side of the central row, then punching either of the next rows immediately adjacent to the punched portion etc., alternating back and forth adjacent to the punched portion until the edge of the belt is reached. It has been found that by use of this punching method, hole location along the length of the groove within any particular groove may be maintained in production within .010 inch tolerance, such tolerance being nonaccumulative within a groove. Thus, such a punching technique is advantageous in allowing for or controlling the effect of lateral belt growth due to perforating the belt.

Assuming that the punching head 25 produces six holes per groove by means of the arrangement shown in FIG. 14, such would be satisfactory for the eleven center rows in FIG. 20. But the one-half-length rows adjacent to each edge of the belt B would require due allowance for the reduction in length, such allowance being automatic. To this end, there has been provided a switch 183, best shown in FIG. 22, carried by a part 155a rigidly secured to the base plate 155, which switch 183 engages an adjustably positioned trip dog 184 carried on the track support 23a. The switch 183 is connected in circuit to disable such of the punch units 168 as are not required for the half-length grooves. Further the switch 183 is also connected to control the actuator 164 to shift the upper slide assembly 163 by such an amount as may be necessary for the same purpose without upsetting other settings and adjustments required at other punching head positions.

In order that the holes produced by the punching head assembly 25 at any position thereof along the tracks 97 and 98 be accurately established, there is provided upon the track support 23a a T-slotted rail 185 extending along the length thereof which supports a selected number of templates such as 186 and 187. The various templates such as 186 and 187 are joined together in selected spaced relation to each other by interconnecting means 188 and are thereafter secured as by nut and bolt assemblies 189 to the T-slotted rail 185. Each template includes a number of tapered openings or recesses 190, each such tapered recess 190 being alternatively receptive of a shot pin 191 having a tapered entrant end, the shot pin 191 being positioned by a relatively strong pneumatic actuator 192. When the punching head assembly 25 is positioned on the tracks 97 and 98 in substantially the desired position, the actuator 192 extends the shot pin 191 into the tapered recess 186. Normally the preliminary positioning will not be precise, and the coaction between the shot pin 191 and the template 186 effected by the taper therein shifts the punching head assembly 25 by a small increment so as to locate and lock the punching head assembly 25 accurately in a predetermined position. Once the shot pin 191 is fully seated, and the punching head assembly 25 has been thereby accurately positioned, a trip dog 193 carried by the shot pin 191 will actuate a switch 194 which serves as an interlock in the control circuit which thereby enables or permits the actual punching to take place.

Referring to FIGS. 11 and 15, the belt B includes a series of rubber layers between which is disposed a pair of fabric and metallic reinforcements R. The metallic reinforcements R are arranged in the rubber as indicated diagrammatically by FIG. 15. Heretofore, where a hole has been cut in such rubber, there was a tendency and a likelihood that a portion of one of the metal or fabric reinforcement elements would extend into the resulting hole for a portion of its length while remaining fastened at one or both ends thereof. The presence of such loose reinforcement material in the hole tended to clog proper flow through the hole, particularly where pulp or pulp fibers were present in the material passing therethrough. Accordingly, the cutting edge of the punch 176 has been provided with a profile of a generally diamond-like configuration wherein the diagonals of the diamonds extend parallel to the reinforcement elements. As is evident from FIG. 15, the various elements R may thus intersect the hole produced, but no increment of length thereof extends parallel to any edge of the hole, and therefore no increment of length thereof, however severed, could hang into and flap around within the hole produced by a cutter or punch having a cutting edge configured in the manner indicated by the line 176a in FIG. 15. FIG. 15 has been prepared to scale to fit the belt grooving dimensions given in the example above, in which example each aperture H would be generally diamond shaped as shown, and have a longer diagonal whose length is about one inch. Therefore, the instant device produces a novel suction belt having this important feature.

*Deckle grooving and punching head assembly 26*

In order to provide the belt B with a pattern that has an edge, marginal, or deckle portion such as that indicated schematically in FIG. 20, and shown in enlarged detail in FIG. 17, a special combined grooving and punching head assembly 26 is provided, the same being shown in FIGS. 16, 18 and 19.

The deckle head assembly 26 includes a base plate 195 movably supported on the tracks 97 and 98 by means of structure substantially identical to that shown in FIG. 13 as there supporting the base plate 155. The base plate 195 supports a pair of guide bars 196 on which a lower slide 197 is slidably supported. A pneumatic actuator 196a is connected to act between the lower slide 197 and the base plate 195 to advance the cutters to belt punching and grooving position, such slide position being defined by a stop 195a on the base plate 195. The actuator 196a also serves to retract the lower slide 197 to establish a substantial clearance adjacent to the belt B for removal and installation thereof.

The lower slide 197 includes a pair of end brackets 198, 199 which jointly support a pair of guide bars 200. The guide bars 200 support an upper slide 201, a pneumatic actuator 202 being connected between the upper slide 201 and the end bracket 199 to move the upper slide 201 horizontally in a direction parallel to the belt B. The upper slide 201 includes four upwardly directed bosses 201a. Above the bosses 201a, there is disposed a plate 203. Four pneumatic actuators 204 interconnect the plate 203 and the upper slide 201 through the bosses 201a so that upon simultaneous actuation of the various actuator cylinders 204, the plate 203 may be vertically repositioned. In the example given above, an available maximum movement of three and one-half inches would be typical. The plate 203 supports the cutting and grooving mechanisms of the deckle head assembly 26.

The movement of the plate 203 and the upper slide 201 with respect to the lower slide 197 by the actuator 202 is limited by the stops 198a and 201b shown on FIGS. 18 and 19.

Secured to the plate 203 by suitable brackets 203a and 203b, best seen in FIG. 19, is a further pneumatic actuator 205, which may be referred to as an upper grooving actuator. The actuator 205 drives a gear rack 206 which is in mesh with a gear 207 (FIG. 18) which drives a cutter gear 208. The cutter gear 208 is carried on a shaft 209 which is rotatably supported in an extension of the bracket 203a, on the lower end of which shaft 209 there is a cutter head having a single cutter knife or blade 138 identical to that previously described and supported in a similar fashion. When the actuator 205 is fully extended, as well as when it is fully retracted, the cutter 138 is slightly spaced from the belt B as shown in broken lines on FIG. 18. When the actuator 205 is substantially at its midposition, the knife or cutter 138 is disposed as shown in solid lines in FIGS. 18 and 19.

Means are provided for insuring the proper amount of angular movement of the shaft 209. As best seen in FIG. 19, there is a toggle link assembly generally indicated at 210 including pairs of links pivoted at 211 to a further extension of the bracket 203a and at 212 to a slidable stop 213. The slidable stop 213 includes a pin-like portion which extends into a recess in the gear rack 206. The various toggle links are pivoted together as at 214 to which pivot there is connected the rod end of a still further actuator 215. When the actuator 215 is extended as shown in solid lines, the slidable stop 213 is as far to the right or toward the actuator 205 as is possible. With the slidable stop 213 in this position, the actutor 205 will drive the gear rack 206 by an amount approximately equal to half its travel so that the cutter 138 is disposed as shown in solid lines, namely is disposed in a position where it is sunk into the belt B. When the pneumatic actuator 215 is retracted as shown in chain lines, the slidable stop 213 is disposed a distance to the left, whereby the actuator 205 may drive the gear rack 206 a greater distance, the distance being sufficient to clear the cutting knife 138 from the surface of the belt B.

When it is desired to make a groove which consists of a continuous arc, the actuator 215 will be placed in the retracted position, whereby the actuator 205 will drive the cutter knife 138 into and out of the belt in a single stroke. The knife blade 138 being ground on both edges, after the belt has been indexed, a return stroke will cut a similar arcuate groove. If it is desired to elongate the groove or to provide an elongated groove, the actuator 215 will be extended as shown in solid lines, the actuator 205 will then sink the knife 138 in the belt, and either the actuator 202 or the motor 100 will translate the same in a direction parallel to the tracks 97 and 98 or guide rails 200. Upon completion of such translation movement, the actuator 215 will be retracted, thereby enabling the actuator 205 to complete the groove.

Also carried comovably with the plate 203 are other brackets 203c and 203d which support a further similar grooving mechanism. This grooving mechanism includes an actuator 216 drivably connected to a gear rack 217 which meshes with a gear 218, the gear 218 serving to drive two gears 219 and 220. The gears 219 and 220 correspond to the gear 208 in that each comprises a cutter gear drivably connected respectively to a pair of cutter shafts 221 and 222 having cutter heads with cutters 138 similar to that described above. The actuator 216 may be referred to as the lower grooving actuator since the lower cutters 138 produce grooves which are spaced downwardly from the groove made by the upper blade. In the example given of specific belt dimensions above, the upper cutter 138 would be spaced from the lower cutters 138 by a multiple of the value or dimension used as the groove-to-groove spacing, plus one-half groove. Thus, the upper cutter 138 may be making a deckle groove which is aligned with one of the elongated grooves while the lower cutters 138 may be making grooves disposed intermediately to a pair of elongated grooves, there thus being sufficient space between the cutters for the cutter heads themselves to function. It is evident that as the belt is indexed, this time by an amount equal to one of the principal grooves, the deckle edge portion will be progressively grooved around the belt. It is to be understood that a toggle link mechanism generally indicated at 223, similar to the toggle link mechanism 210, is provided for the lower gear rack 217. Since the details thereof do not differ from the upper toggle link mechanism 210, a repetition of the description thereof is unwarranted.

When the grooving of the deckle edge portion of the belt B has been completed, the plate 203 may be shifted in the same manner and by the same means as suggested above for elongating one of the grooves. Thus, the actuator 202 can shift the upper slide assembly 201 from the position shown in solid lines in FIG. 19 to a position with respect to the base plate 195 where the punches would occupy the position in which the cutters 138 are illustrated. This will align the same with the same portion of the belt for perforating the grooves made by the cutters 138.

As best seen in FIG. 19, there are provided two punch assemblies, namely an upper punch assembly 224 and a lower punch assembly 225.

To support the punch assemblies 224 and 225, there is provided a platform 226 disposed by spacers 227 above the plate 203 in rigid position and thus forming functionally a part thereof. To the upper surface of the platform 226 there is disposed a series of four bearing blocks 228a–228d, while secured to the lower surface of the platform 226 there is a set of similar bearing blocks, each identified with the numeral 229. The upper bearing blocks 228 slidably support a pair of slide rods 230, each of which is connected to a support bar 231. The support bar, thus supported, is drivably connected to a pneumatic actuator 224a secured to the platform 226 for reciprocation thereby. A number of spacers 232 are threaded into the support bar 231, and at their other ends support a punch bar 233 to which a pair of hollow punches 234 are secured. Adjacent to the punches 234, there is provided a presser and stripper plate 235, a set of bolts 236 secured thereto and guided in the punch bar 233, and a set of springs 237. The elements 235–237 are functionally similar to the elements 173–175 described above. Likewise, the punches 234 are hollow, and rubber slugs are removed therefrom by an ejector pin or plunger 238, similar to the ejector pin or plunger 178, which coacts with a stop plate 239 having a foot secured to the plate 203.

The lower punch assembly 225 includes an actuator 225a connected to drive a further support bar similar to the bar 231 carried by similar slide rods 230 which are slidably supported by the bearing blocks 229. Thus, spacers 232 support a further punch bar 233 for accommodating the lower punches 240 as described before.

The upper and lower punching assemblies 224 and 225 are provided with suitable limit switches such as limit switches 180 employed in the head of FIG. 13, and the operation of the structure of FIG. 16 is therefore effected in a similar "bounce" manner to obtain smooth surface holes in rubber when the punches 234 and 240 employed are at room temperature. In view of the small quantity of punches involved, and their combined areas, as shown in FIG. 19, sticking does not occur when the four punches of the lower punch assembly 225 are jointly passed through the belt B.

The vertical spacing of the punches 234 from each other, and the vertical spacing of the punches 240 from each other represents two grooves. In operation, the six punches illustrated provide six holes in the belt, after which the actuators 204 raise the punches by a distance equivalent to four grooves to provide a further set of holes. The belt is then indexed one groove and a further set of holes is provided and the punches are then returned by the actuators 204 to the illustrated position to provide a fourth set of holes. The belt may then be indexed seven spaces after which the foregoing steps are repeated. Where each space or groove in a certain row is three-fourths inch apart, the indexing by the actuators 204 for a distance of four spaces requires a movement of three inches. If slight excess travel is available therein, such as one-half inch, an appropriate internal spacer is used therein (not shown) so as to have a total movement in the actuators 204 representing, in this example, four actual spaces or grooves.

It will thus be seen that the disclosed invention meets all of the objects set forth herein.

Although various minor modifications might be suggested by those versed in the art, it should be understood

We claim as our invention:

1. A device for machining a massive belt comprising in combination:
   (a) a plurality of means for supporting the belt for rotation about a plurality of parallel axes;
   (b) a drive mechanism drivably connected to said belt-support means, said drive mechanism including selectively operative means for rotating the belt continually and also for rotating the belt incrementally; and
   (c) a machining head supported adjacent to the belt, and adapted to remove part of the material of the belt between increments of rotation thereof.

2. A device for machining a massive belt comprising in combination:
   (a) means for rotatably supporting the belt;
   (b) a rotatably driven shaft;
   (c) a rotatable member drivably connected to said belt-support means;
   (d) an electric clutch having an inner portion corotatably keyed to said driven shaft, and an outer portion corotatable with said inner portion only when said clutch is energized electrically;
   (e) an electric brake having a fixedly supported inner portion, and an outer portion which is rotatable relative thereto only when said brake is not energized electrically;
   (f) means mechanically connecting said rotatable member and said outer clutch and brake portions together as a unit for corotation;
   (g) means for alternatively energizing said clutch and said brake; and
   (h) a machining head supported adjacent to and adapted to act on the belt when said brake is energized electrically.

3. A device for machining a massive belt comprising in combination:
   (a) means for rotatably supporting the belt;
   (b) a drive mechanism adapted to rotate in only one direction and including an eccentric mechanism adapted to provide angularly oscillating motion;
   (c) a pair of one-way clutches, each drivably connected to said rotatable belt-support means, and respectively arranged to drive said belt-support means in opposite directions;
   (d) an arm connected to said eccentric mechanism to be angularly oscillated thereby and being selectably connected to one of said clutches to effect incremental rotation of said belt-support means in one direction, and to the other of said clutches to effect incremental rotation of said belt-support means in the opposite direction; and
   (e) a machining head supported adjacent to the belt, and adapted to remove part of the material of the belt between increments of rotation thereof.

4. A device for machining a massive belt comprising in combination:
   (a) means for rotatably supporting the belt;
   (b) an intermittent drive mechanism drivably connected to said belt-support means for incrementally rotating the same;
   (c) control means engageable with the belt and responsive to actual movement thereof, said control means being operative on said drive mechanism to determine the extent of each incremental movement thereof; and
   (d) a machining head supported adjacent to the belt and adapted to act on the belt between increments of rotation thereof.

5. A device for machining a massive belt comprising in combination:
   (a) means for rotatably supporting the belt;
   (b) a drive mechanism including an electric clutch arranged to transmit power to said belt-support means, and an electric brake arranged to hold said belt-support means against rotation;
   (c) control means engageable with the belt and responsive to actual movement thereof, said control means including switch means arranged to provide electric power to said clutch and said brake alternatively so as to effect an incremental movement of controlled extent of the belt; and
   (d) a machining head supported adjacent to the belt and adapted to act on the belt between increments of rotation thereof.

6. A device for machining a massive belt comprising in combination:
   (a) means for rotatably supporting the belt;
   (b) an intermittent drive mechanism drivably connected to said belt-support means for incrementally rotating the same;
   (c) a first machining head slidably supported adjacent to the belt and having means for grooving the belt between increments of rotation thereof; and
   (d) a second machining head slidably supported adjacent to the belt and having means for perforating the belt between increments of rotation thereof, only one of said machine heads being positionable to act on the belt at any one time.

7. A device for machining a massive belt comprising in combination:
   (a) means for rotatably supporting the belt;
   (b) an intermittent drive mechanism drivably connected to said belt-support means for incrementally rotating the same;
   (c) a pair of elongated tracks extending parallel to the rotational axes of said belt-support means, and supported independently thereof, and having a longitudinal extent which is somewhat greater than said belt-support means;
   (d) a plurality of powered machining heads movably supported on said tracks for successive positioning adjacent to the belt, and adapted respectively to groove and to perforate the belt between increments of rotation thereof, each of said heads having a control and power cable extending upwardly therefrom; and
   (e) conveyor means supported above said tracks and extending substantially coextensive therewith, said conveyor means supporting the control and power cables of said heads in their movements adjacent to and beyond said belt-support means.

8. A device for machining a massive belt comprising in combination:
   (a) means for supporting the belt for rotation about a plurality of parallel axes;
   (b) an intermittent drive mechanism drivably connected to said belt-support means for incrementally rotating the same; and
   (c) a machining head supported adjacent to the belt and having first tooling operative on the belt between increments of rotation thereof, said machining head being translatable in the direction of the rotational axes of the belt-support means, and having second tooling operative similarly on the belt at a point offset in the direction of incremental belt movement by an amount less than the extent of such increment of movement to effect a staggered pattern on the belt.

9. A device for machining a massive belt comprising in combination:
   (a) means for rotatably supporting the belt;
   (b) an intermittent drive mechanism drivably connected to said belt-support means for incrementally rotating the same in uniform increments; and
   (c) a machining head supported adjacent to the belt including a first pair of tools spaced in the direction of belt movement and operative on the belt between increments of rotation thereof, and a second similar pair of tools spaced from each other in the direction of belt movement, and operative on the belt without further belt movement, said second pair of tools being offset from said first pair of tools in the direction of belt movement by an amount equal to one-half of such increment of belt movement.

10. A device for machining a massive belt comprising in combination:
   (a) means for rotatably supporting the belt;
   (b) an intermittent drive mechanism drivably connected to said belt-support means for incrementally rotating the same in uniform increments; and
   (c) a machining head supported adjacent to the belt including first tooling operative on the belt between successive increments of rotation thereof to provide a first pattern of uniformly spaced elements therein, said head including second tooling operative without further indexing of said belt to provide a uniformly spaced second pattern therein offset in the direction of belt movement by an amount equal to one-half a pattern element.

11. A method of machining a massive belt comprising the steps of:
   (a) rotating the belt continually about a plurality of axes for that period of time needed to stabilize internal tensions thereof as evidenced by constant tracking;
   (b) thereafter rotating the belt intermittently about said axes; and
   (c) machining the belt between increments of movement while the belt is stationary.

12. A method of machining a massive rubber belt comprising the steps of:
   (a) rotating the belt continually about a plurality of axes under normal operating tension for that period of time needed to make the belt track constantly of itself;
   (b) thereafter, rotating the belt in uniform increments of intermittent movement; and
   (c) performing a similar rubber-removing machining operation on the belt between each increment of movement to obtain a uniform machined pattern thereon.

13. A method of machining a massive rubber belt comprising the steps of:
   (a) rotating the belt continually about a plurality of axes under normal operating tension for that period of time needed to make the belt track constantly of itself;
   (b) thereafter, rotating the belt in uniform increments of intermittent movement; and
   (c) between each increment of movement, mechanically translating a grooving cutter along and partially through only one side of the belt, while back-supporting the belt at the cutter, to form a groove in the belt.

14. A method of machining a massive rubber belt comprising the steps of:
   (a) rotating the belt continually about a plurality of axes under normal operating tension for that period of time needed to make the belt track constantly of itself;
   (b) thereafter, rotating the belt in uniform increments of intermittent movement; and
   (c) between each increment of movement, and while supporting the belt against any substantial deflection, mechanically translating a grooving cutter along an arcuate path extending partially through the belt, thence along a linear path parallel to the belt, and thence along an arcuate path leading out of the belt, to form a groove in the belt.

15. A method of machining a massive rubber belt comprising the steps of:
   (a) with the belt stationary, mechanically removing rubber therefrom corresponding to an element of a pattern;
   (b) rotating the belt by an amount corresponding substantially to the extent of said element, said amount being determined by sensing actual belt movement near the point where rubber is to be removed; and
   (c) repeating the preceding steps until the pattern is complete,
   whereby there is continual compensation for the increase in effective belt length.

16. A device for machining a massive belt comprising in combination:
   (a) means for intermittently rotatably supporting the belt about a plurality of axes with a substantial portion of the belt held in a flat vertical plane;
   (b) a substantially rigid flat rubber platten disposed at one side of said vertical plane for backing up one side of the belt;
   (c) resilient rotatable ring means for applying a holding force to the other side of the belt to urge it against said rubber platten backup member when the belt is stationary;
   (d) a rubber-removing tool operative between intermittent belt movements on the vertical belt portion adjacent to said holding means; and
   (e) a support member supporting both said rotatable ring means and said tool for joint translation in a direction parallel to said axes.

17. A device for machining a massive belt comprising in combination:
   (a) means for supporting the belt in a succession of stationary positions; and
   (b) a machining head supported adjacent to the belt, said head including
      (1) a grooving tool supported by a rotatable shaft and projecting radially therefrom, and
      (2) a drive mechanism operative to rotate said shaft for only a partial turn.

18. A device for machining a massive belt comprising in combination:
   (a) means for supporting the belt in a succession of stationary positions; and
   (b) a machining head supported adjacent to the belt, said head including
      (1) a grooving tool supported by a rotatable shaft and projecting radially therefrom, and
      (2) a fluid actuator operatively drivably connected to said shaft to effect driven rotation thereof for less than 360°.

19. A device for machining a massive belt comprising in combination:
   (a) means for supporting the belt in a succession of stationary positions; and
   (b) a machining head supported adjacent to the belt, said head including
      (1) a grooving tool supported by a rotatable shaft and projecting radially therefrom,
      (2) a first gear corotatably carried on said shaft,
      (3) a second gear engageable with said first gear, and
      (4) a fluid actuator operatively drivably connected to said second gear to effect rotation of said shaft for less than a full turn.

20. A device for machining a massive belt comprising in combination:
   (a) means for supporting the belt in a succession of stationary positions; and
   (b) a machining head supported adjacent to the belt, said head including
      (1) a grooving tool supported by a rotatable shaft and projecting radially therefrom,
      (2) a ratchet mechanism drivably connected to said shaft, and (3) a fluid actuator reciprocably connected to said ratchet mechanism for rotating said shaft in distinct angular increments of movement.

21. A device for machining a massive belt comprising in combination:
 (a) means for supporting the belt in a succession of stationary positions;
 (b) a machining head supported adjacent to the belt, said head including
  (1) a grooving tool supported by a rotatable shaft and projecting radially therefrom, and
  (2) a drive mechanism operative to rotate said shaft for only a partial turn to position the tool in the belt; and
 (c) means for translating said head as a unit parallel to said belt for producing an elongated groove therein.

22. A device for machining a massive belt comprising in combination:
 (a) means for supporting the belt in a succession of stationary positions; and
 (b) a machining head supported adjacent to the belt, said head including
  (1) a grooving tool supported by a rotatable shaft and projecting radially therefrom, and
  (2) a drive mechanism operative to rotate said shaft in one direction to dispose said tool in three predetermined positions where the tool is respectively spaced from the belt, sunk into the belt, and again spaced from the belt.

23. A device for machining a massive belt comprising in combination:
 (a) means for supporting the belt in a succession of stationary positions; and
 (b) a machining head supported adjacent to the belt, said head including
  (1) a grooving tool supported by a rotatable shaft and projecting radially therefrom, and
  (2) a drive mechanism for rotating said shaft in increments, said drive mechanism including a pawl and ratchet mechanism, the pawl of which is operative to define a series of predetermined fixed grooving tool positions.

24. A device for machining a massive belt comprising in combination:
 (a) means for supporting the belt in a succession of stationary positions; and
 (b) a machining head supported adjacent to the belt, said head including
  (1) a grooving tool supported by a rotatable shaft and projecting radially therefrom, and
  (2) a drive mechanism for rotating said shaft, said drive mechanism including a toggle link operative when extended to limit shaft rotation to a first predetermined position, and when retracted to limit shaft rotation to a second predetermined position.

25. A method of providing a massive endless belt subject to growth with a precisely arranged pattern comprising:
 (a) providing a circumferential index mark around the belt substantially at its center;
 (b) rotating the belt continually on a plurality of rolls prior to providing said pattern until the index mark attains a stable position; and
 (c) thereafter machining the belt to provide the pattern therein.

26. A device for machining a massive belt comprising in combination:
 (a) means for supporting the belt in a succession of stationary positions; and
 (b) a machining head supported adjacent to the belt, said head including
  (1) a grooving tool supported by a rotatable shaft and projecting radially therefrom, and
  (2) a drive mechanism for rotating said shaft to one of a series of predetermined grooving tool positions, said drive mechanism including a ratchet operative to advance said shaft angularly to a point beyond said one position, and a pawl operative to arrest said shaft at said one position, said shaft being returnable toward said one position in response to a reactive torque applied thereto by the belt acting through said grooving tool.

27. A device for machining a massive belt comprising in combination:
 (a) means for supporting the belt in a succession of stationary positions; and
 (b) a machining head supported adjacent to the belt, said head including
  (1) a grooving tool supported by a rotatable shaft and projecting radially therefrom, and
  (2) a drive mechanism for rotating said shaft to one of a series of predetermined grooving tool positions, said drive mechanism including a pawl and ratchet mechanism adapted to be overdriven by such an amount as to provide a substantial backlash at each operation thereof.

28. A method of machining a massive rubber belt comprising the steps of:
 (a) rotating the belt in increments of uniform intermittent movement; and
 (b) performing a similar rubber grooving operation on the belt between each increment of movement to obtain a uniformly spaced groove pattern therein, each grooving operation including providing a first complete groove with a first cutter and thereafter, but prior to any further rotation of the belt, an offset complete groove with a second cutter.

29. A device for machining a massive belt comprising in combination:
 (a) means for supporting the belt in a succession of stationary positions; and
 (b) a machining head supported adjacent to the belt, said head including
  (1) a first grooving tool supported by a rotatable shaft and projecting radially therefrom,
  (2) a second grooving tool supported by said shaft and offset from said first tool both in an axial and in an angular direction therefrom, and
  (3) a drive mechanism operative to rotate said shaft to predetermined positions where either one or neither of said tools is selectably engaged with the belt.

30. A device for machining a massive belt comprising in combination:
 (a) means for rotatably supporting the belt;
 (b) an intermittent drive mechanism drivably connected to said belt-support means for incrementally rotating the same; and
 (c) a machining head supported on the tracks adjacent to the belt, said head having
  (1) a first portion adapted to provide at least one groove in the belt between increments of rotation of the belt, and
  (2) a second portion adapted to produce at least one perforation through the belt between increments of rotation thereof.

31. A device for machining a massive belt comprising in combination:
 (a) means for rotatably supporting the belt;
 (b) an intermittent drive mechanism drivably connected to said belt-support means for incrementally rotating the same;
 (c) a punching head supported adjacent to the belt and adapted to produce at least one perforation through the belt between increments of rotation thereof;

(d) a back-up platten disposed adjacent to said punching head for supporting the opposite side of the belt during punching; and (e) means slidably supporting said platten for movement parallel to the rotational axes of the belt.

32. A device for machining a massive belt comprising in combination:

(a) means for rotatably supporting the belt;

(b) an intermittent drive mechanism drivably connected to said belt-support means for incrementally rotating the same;

(c) elongated stationary support means extending adjacent to the belt;

(d) a punching head movably carried by said support means for movement along said support means, said head being adapted to produce at least one perforation through the belt between increments of rotation thereof; and (e) a tapered aligning mechanism having disengageable coacting parts carried by said support means and said head, and operative through its taper on being engaged to shift said head along said support means to a predetermined precisely located position.

33. A device for machining a massive belt comprising in combination:

(a) means for rotatably supporting the belt;

(b) an intermittent drive mechanism drivably connected to said belt-support means for incrementally rotating the same;

(c) elongated stationary support means extending adjacent to the belt;

(d) a punching head movably carried by said support means for movement along said support means, said head being adapted to produce a pattern of perforations through the belt between increments of rotation thereof; and (e) means responsive to movement of said head along said support means, and operative to modify said pattern of perforations.

References Cited by the Examiner

UNITED STATES PATENTS

| | | | |
|---|---|---|---|
| 1,341,450 | 5/1920 | Zawistowski | 83—217 |
| 1,498,935 | 6/1924 | Shull | 83—5 X |
| 1,583,317 | 5/1926 | Senecal et al. | 30—293 |
| 1,661,533 | 3/1928 | Gantz | 83—217 |
| 1,751,549 | 3/1930 | Hope et al. | 83—5 |
| 1,878,643 | 9/1932 | Recke | 234—75 X |
| 1,895,025 | 1/1933 | Dean | 83—34 |
| 2,040,364 | 5/1936 | Dean | 83—34 |
| 2,677,313 | 3/1954 | Biegert | 83—5 |
| 2,727,438 | 12/1955 | Gack | 90—38 |
| 2,751,980 | 6/1956 | Garver | 83—5 X |
| 2,801,693 | 8/1957 | Lorig | 83—5 |
| 2,803,302 | 8/1957 | Kuts | 83—7 |
| 2,981,329 | 4/1961 | Justus | 162—367 |
| 3,025,910 | 3/1962 | Beachler et al. | 162—367 |

FOREIGN PATENTS 611,777  4/1935  Germany.

WILLIAM W. DYER, Jr., *Primary Examiner.*

ANDREW R. JUHASZ, *Examiner.*

J. M. MEISTER, *Assistant Examiner.*